US010812818B2

(12) United States Patent
Choi et al.

(10) Patent No.: US 10,812,818 B2
(45) Date of Patent: Oct. 20, 2020

(54) NETWORK ABSTRACTION UNIT LAYER TYPE CLASSES IN NETWORK ABSTRACTION LAYER UNIT HEADER

(71) Applicant: TENCENT AMERICA LLC, Palo Alto, CA (US)

(72) Inventors: Byeongdoo Choi, Palo Alto, CA (US); Stephan Wenger, Hillsborough, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/403,786

(22) Filed: May 6, 2019

(65) Prior Publication Data
US 2020/0195946 A1    Jun. 18, 2020

Related U.S. Application Data

(60) Provisional application No. 62/704,039, filed on Jan. 2, 2019, provisional application No. 62/780,148, filed on
(Continued)

(51) Int. Cl.
*H04N 19/44*    (2014.01)
*H04N 19/169*    (2014.01)
(Continued)

(52) U.S. Cl.
CPC .......... *H04N 19/44* (2014.11); *H04N 19/132* (2014.11); *H04N 19/188* (2014.11); *H04N 19/70* (2014.11)

(58) Field of Classification Search
CPC .... H04N 19/176; H04N 19/11; H04N 19/186; H04N 19/593; H04N 19/105; H04N 19/197; H04N 19/436; H04N 19/13; H04N 19/167; H04N 19/174; H04N 19/184; H04N 19/44; H04N 19/136; H04N 19/159; H04N 19/46; H04N 19/463; H04N 19/70; H04N 13/139; H04N 13/161; H04N 13/178; H04N 19/00; H04N 19/119; H04N 19/132; H04N 19/196; H04N 19/20; H04N 19/30;
(Continued)

(56) References Cited

U.S. PATENT DOCUMENTS

2008/0317124 A1* 12/2008 Cho .................... H04N 19/597
375/240.08
2009/0177949 A1    7/2009 Lamy-Bergot et al.
(Continued)

OTHER PUBLICATIONS

High Efficiency Video Coding (HEVC) text specification draft 10 (for FDIS & Last Call), Joint Collaborative Team on Video Coding (JCT-VC) of ITU-T SG 16 WP 3 and ISO/IEC JTC 1/SC 29/WG 11 12th Meeting: Geneva, CH, Jan. 14-23, 2013 Document: JCTVC-L1003_v34 (Year: 2013).*
(Continued)

*Primary Examiner* — Nathnael Aynalem
(74) *Attorney, Agent, or Firm* — Sughrue Mion, PLLC

(57) ABSTRACT

A method and apparatus for decoding a video sequence include decoding a fixed length binary coded network abstraction layer unit (NALU) class type included in an NALU header. An NALU type in the NALU header is decoded. A picture is reconstructed, and a type of the picture is identified by a combination of the NALU class type and the NALU type.

18 Claims, 14 Drawing Sheets

Related U.S. Application Data on Dec. 14, 2018, provisional application No. 62/780,154, filed on Dec. 14, 2018.

(51) Int. Cl.
*H04N 19/132* (2014.01)
*H04N 19/70* (2014.01)

(58) Field of Classification Search
CPC ........ H04N 19/33; H04N 19/51; H04N 19/59; H04N 19/60; H04N 19/80; H04N 19/96; H04N 21/23412; H04N 21/234327; H04N 21/2353; H04N 21/816
USPC .......................................... 375/240.01–240.29
See application file for complete search history.

(56) References Cited

U.S. PATENT DOCUMENTS

| | | | |
|---|---|---|---|
| 2013/0034170 A1* | 2/2013 | Chen | H04N 13/00 375/240.25 |
| 2013/0114670 A1* | 5/2013 | Chen | H04N 19/597 375/240.02 |
| 2013/0182755 A1 | 7/2013 | Chen et al. | |
| 2014/0010277 A1* | 1/2014 | Wang | H04N 19/70 375/240.02 |
| 2014/0064363 A1* | 3/2014 | Samuelsson | H04N 19/50 375/240.12 |
| 2014/0269899 A1* | 9/2014 | Park | H04N 19/44 375/240.02 |

OTHER PUBLICATIONS

International Search Report dated Mar. 5, 2020, issued by the International Searching Authority in application No. PCT/US2019/065634.

Written Opinion dated Mar. 5, 2020, issued by the International Searching Authority in application No. PCT/US2019/065634.

\* cited by examiner

FIG. 1

| | C | Descriptor |
|---|---|---|
| 101 nal_unit( NumBytesInNALunit ) { | | |
| 108 forbidden_zero_bit | All | f(1) |
| nal_ref_idc | All | u(2) |
| 102 nal_unit_type | All | u(5) |
| NumBytesInRBSP = 0 | | |
| nalUnitHeaderBytes = 1 | | |
| 103 if( nal_unit_type == 14 \|\| nal_unit_type == 20 \|\| nal_unit_type == 21 ) { | | |
| if( nal_unit_type != 21 ) | | |
| svc_extension_flag | All | u(1) |
| else | | |
| avc_3d_extension_flag | | |
| if( svc_extension_flag ) { | All | u(1) |
| nal_unit_header_svc_extension( ) /* specified in Annex G */ | All | |
| nalUnitHeaderBytes += 3 | | |

| | | Descriptor |
|---|---|---|
| 104 nal_unit_header( ) { | | |
| 109 forbidden_zero_bit | | f(1) |
| 105 nal_unit_type | | u(6) |
| 106 nuh_layer_id | | u(6) |
| 107 nuh_temporal_id_plus1 | | u(3) |
| } | | |

FIG. 5  Encoder 303

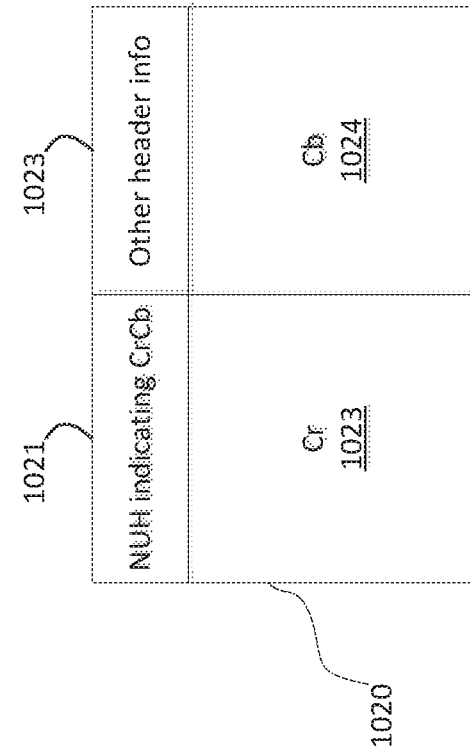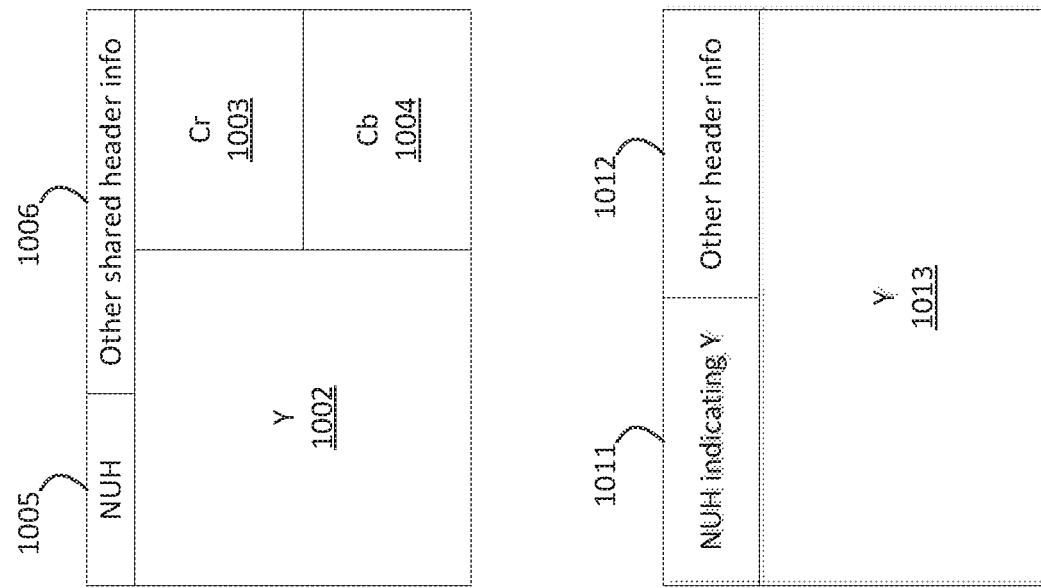
FIG. 10

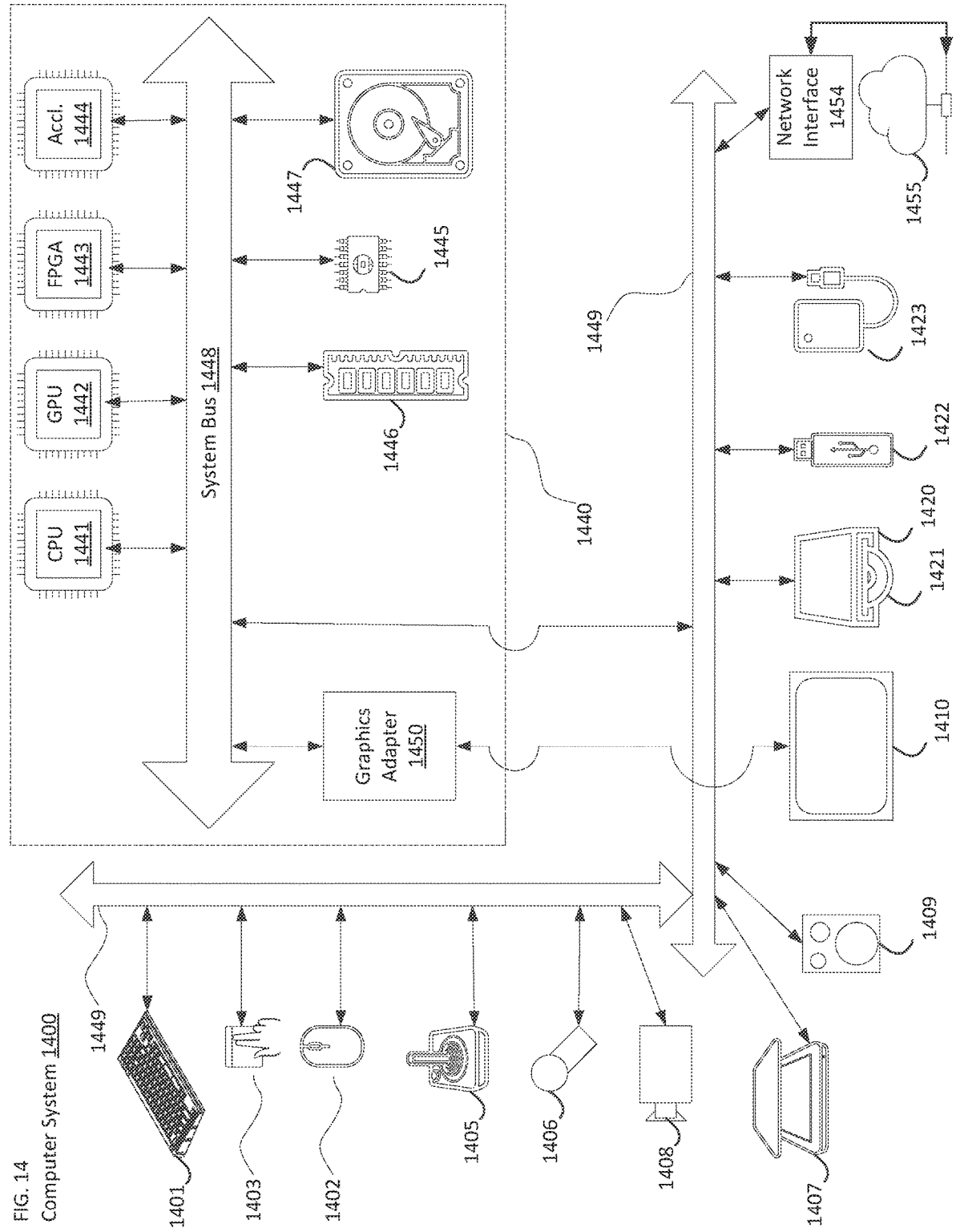

NETWORK ABSTRACTION UNIT LAYER TYPE CLASSES IN NETWORK ABSTRACTION LAYER UNIT HEADER

CROSS-REFERENCE TO RELATED APPLICATIONS

This application claims priority under 35 U.S.C. § 119 to U.S. Provisional Application No. 62/704,039 filed Jan. 2, 2019, U.S. Provisional Application No. 62/780,148 filed Dec. 14, 2018, and U.S. Provisional Application No. 62/780,154 filed Dec. 14, 2018 in the United States Patent & Trademark Office, which are hereby incorporated by reference herein in their entireties.

FIELD

The disclosed subject matter relates to video coding and decoding, and more specifically, to the coding of the Network Abstraction Layer (NAL) Unit (NALU) header involving NALU type classes.

BACKGROUND

Video coding and decoding using inter-picture prediction with motion compensation has been known for decades. Uncompressed digital video can consist of a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080 p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding, some of which will be introduced below.

The concept of a Network Abstraction Layer was introduced in ITU-T Rec. H.264. A coded video bitstream can be divided into individual units, called Network Abstraction Layer (NAL) Units. Each NAL unit can have a header that can be interpreted without adherence to start code emulation prevention (that may otherwise need to be adhered to, potentially at substantial implementation and computational cost, in other parts of the NAL unit). The NAL unit header in H.264 (101), was designed such that it included only fixed length codewords, as shown in FIG. 1. For certain values of nal_unit_type (102), certain extensions to the NAL unit header (103) were available by adding a second and sometimes third octet, each of which also contained fixed length codewords. A Media Aware Network Element (MANE), MCU, file rewriter, etc., could make use of these fixed length codewords to effectively tailor a bitstream, without full transcoding and without being constrained by start code emulation prevention.

In H.265, a somewhat simplified design was chosen. The H.265 NAL unit header (104) was fixed length at two octets, and included a NAL unit type (105), spatio/SNR layer ID (106) and temporal layer ID (107). No extension mechanism was present. Compared to the H.264 design, this design had a certain coding efficiency penalty as the header was always 2 octets in length, compared to the variable length, but often 1 octet length of the H.264 design. On the other hand, the support of scalable and Multiview extensions was greatly simplified, allowing for a certain backward compatibility between scalable/Multiview and non-scalable/Multiview legacy encoding.

Further, the concept of dividing a coded video bitstream into packets for transportation over packet networks has been in use for decades. Early on, video coding standards and technologies were in their majority optimized for bit-oriented transport, and defined bitstreams. Packetization occurred in system layer interfaces specified, for example, in Real-time Transport Protocol (RTP-) payload formats. With the advent of Internet connectivity suitable for mass-use of video over the Internet, the video coding standards reflected that prominent use case through the conceptual differentiation of a video coding layer (VCL) and a network abstraction layer (NAL). NAL units were introduced in H.264 in 2003, and have been retained in certain video coding standards and technologies since then with only slight modifications.

An NAL unit can, in many cases, be seen as the smallest entity on which a decoder can act upon without necessarily having decoded all preceding NAL units of a coded video sequence. Insofar, NAL units enable certain error resilience technologies as well as certain bitstream manipulation techniques, to include bitstream pruning, by Media Aware Network Elements (MANEs) such as Selective Forwarding Units (SFUs) or Multipoint Control Units (MCUs).

FIG. 1 depicts relevant parts of the syntax diagram of NAL unit headers in accordance with H.264 (101) and H.265 (104), in both cases without any of their respective extensions. In both cases, the forbidden_zero_bit (108, 109) is a zero bit used for start code emulation prevention in certain system layer environments. The nal_unit_type (102, 105) syntax elements refers to the type of data a NAL unit carries, which can be, for example, one of certain slice types, parameter set types, Supplementary Enhancement Information (SEI-) message, and so on. The H.265 NAL unit header further comprises nuh_layer_id (106) and nuh_temporal_id_plus1 (107), which indicate the spatial/SNR and temporal layer of a coded picture the NAL unit belongs to.

It can be observed that the NAL unit header includes only easily parseable fixed length codewords, that do not have any parsing dependency to other data in the bitstream such as, for example, other NAL unit headers, parameter sets, and so on. As NAL unit headers are the first octets in a NAL unit, MANEs can easily extract them, parse them, and act on them. Other high level syntax elements, for example slice or tile headers, in contrast, are less easily accessible to MANEs as they may require keeping parameter set context and/or the processing of variable length or arithmetically coded codepoints.

It can further be observed that the NAL unit headers as shown in FIG. 1 do not include information that can associate a NAL unit to a coded picture that is composed of a plurality of NAL units (such as, for example, comprising multiple tiles or slices, at least some of which being packetized in individual NAL units).

Certain transport technologies such as RTP (RFC 3550), MPEG-system standards, ISO file formats, and so on, may include certain information, often in the form of timing information such as presentation time (in case of MPEG and ISO file format) or capture time (in case of RTP) that can be easily accessible by MANEs and can help associating their respective transport units with coded pictures. However, the semantics of these information can differ from one transport/storage technology to another and may have no direct relationship with the picture structure used in the video coding. Accordingly, this information may be, at best, heuristics and may also not be particularly well suited to identify whether or not NAL units in a NAL unit stream belong to the same coded picture.

Further, in image or video coding, a component can refer to a collection of sample values arranged normally in a two-dimensional matrix of a certain resolution in x and y dimension. In older image and video coding technologies, a component was often associated with a color primary. For example, in some of the older video or image compression standards such as H.261 or JPEG, a YCrCb color model was used, with Y, CR, and Cb being the exactly three color primaries that collectively made up the three components. Using a sampling structure known as 4:2:0, the resolution of the luminance Y component was twice as high in x and y dimension each, as the resolution of the color Cr and Cb components. These relationships are hard coded into the aforementioned older standards and technologies. Even in these older standards and technologies, certain components can be useful without others. For example, the Y component, when decoded and displayed in isolation, represents the type of image and video known from black and white photographs, movies, and TV.

More modern image and video coding technologies and standards such as MPEG-2 and H.264 can support more and other color primaries and additional sampling structures, necessitating codepoints in high level syntax structures such as sequence headers and parameter sets describing which components and sampling structures are in use.

Even more recently, certain techniques such as Versatile Video Coding (VVC), point cloud coding (PCC), (surface) light fields, and others start to emerge. In these forthcoming standards and technologies, components other than color components become relevant. Examples of those other components include transparency, reflectiveness, absorption, 3D geometry information (XYZ), occupancy map, surface normal vector, auxiliary information, depth map and in certain 3D formats, the color components may be different for a given sample in 3D space depending on the viewpoint of the observer.

SUMMARY

According to an aspect of the disclosure, a method for decoding a video sequence includes decoding a fixed length binary coded network abstraction layer unit (NALU) class type included in an NALU header; decoding an NALU type in the NALU header; and reconstructing a picture, wherein a type of the picture is identified by a combination of the NALU class type and the NALU type.

According to an aspect of the disclosure, a device for decoding a video sequence includes at least one memory configured to store program code; and at least one processor configured to read the program code and operate as instructed by the program code, the program code includes decoding code configured to cause the at least one processor to: decode a fixed length binary coded network abstraction layer unit (NALU) class type included in an NALU header; and decode an NALU type in the NALU header; and reconstructing code configured to cause the at least one processor to reconstruct a picture, wherein a type of the picture is identified by a combination of the NALU class type and the NALU type.

According to an aspect of the disclosure, a non-transitory computer-readable medium storing instructions, the instructions comprising: one or more instructions that, when executed by one or more processors of a device, cause the one or more processors to: decode a fixed length binary coded network abstraction layer unit (NALU) class type included in an NALU header; decode an NALU type in the NALU header; and reconstruct a picture, wherein a type of the picture is identified by a combination of the NALU class type and the NALU type.

BRIEF DESCRIPTION OF THE DRAWINGS

Further features, the nature, and various advantages of the disclosed subject matter will be more apparent from the following detailed description and the accompanying drawings in which:

FIG. 1 is a schematic illustration of NALU Headers in accordance with H.264 and H.265

FIG. 10 is a schematic illustration of a NAL units carrying various components or components group, in accordance with an embodiment.

FIG. 14 is a schematic illustration of a computer system in accordance with an embodiment.

PROBLEM TO BE SOLVED

The H.264 NAL unit header is in many cases compact, but insufficient for certain applications. The H.265 NAL unit header effectively supports scalability and Multiview, but lack support for certain other technologies like 360 video coding, and, at two octets in length, is unnecessarily long for certain other applications. Therefore, a design is needed that retains the compactness of the H.264 NAL unit header while offering efficient support of modern applications.

DETAILED DESCRIPTION

Figure 2:
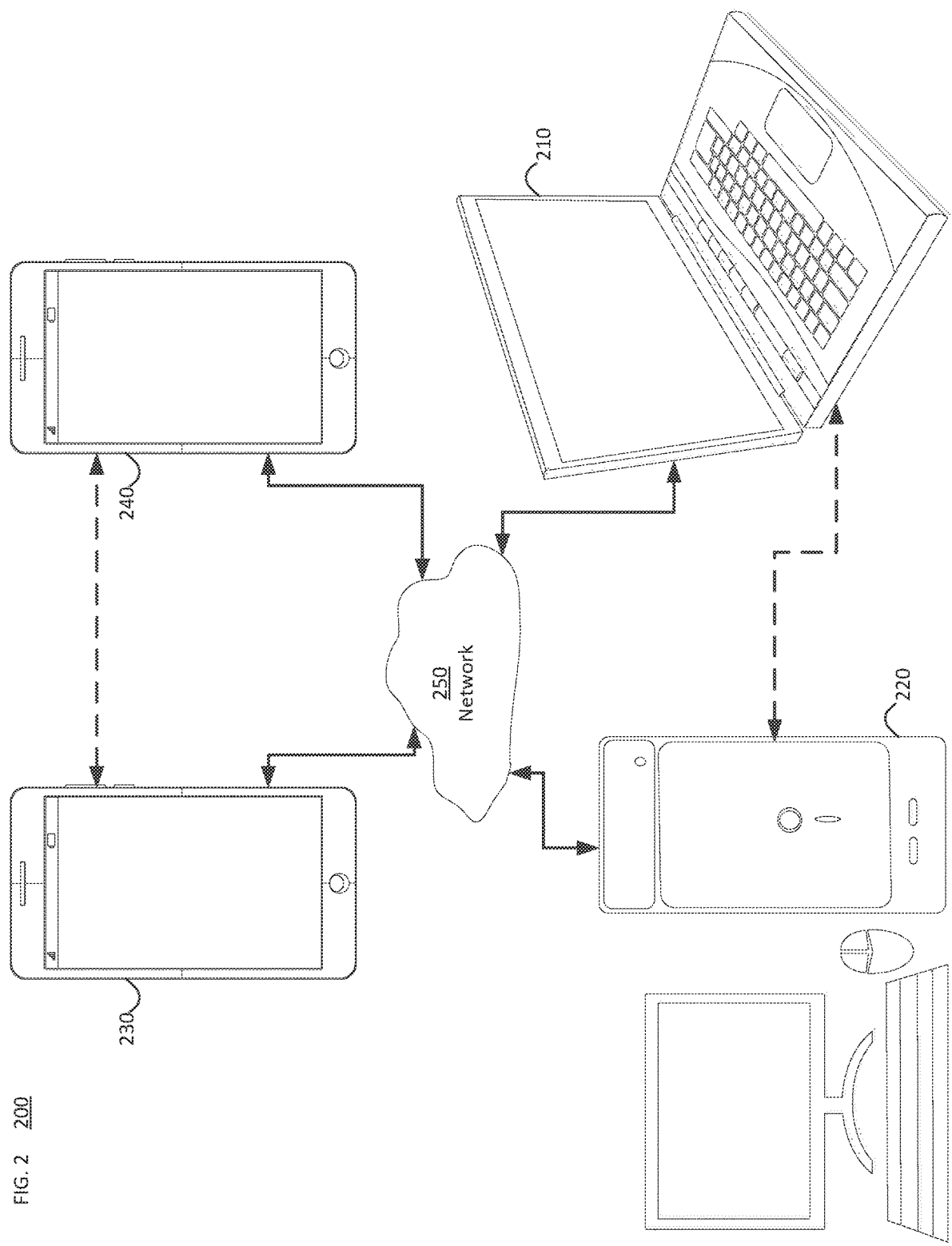
FIG. 2 is a schematic illustration of a simplified block diagram of a communication system in accordance with an embodiment.

FIG. 2 illustrates a simplified block diagram of a communication system (200) according to an embodiment of the present disclosure. The system (200) may include at least two terminals (210-220) interconnected via a network (250). For unidirectional transmission of data, a first terminal (210) may code video data at a local location for transmission to the other terminal (220) via the network (250). The second terminal (220) may receive the coded video data of the other terminal from the network (250), decode the coded data and display the recovered video data. Unidirectional data transmission may be common in media serving applications and the like.

FIG. 2 illustrates a second pair of terminals (230, 240) provided to support bidirectional transmission of coded video that may occur, for example, during videoconferencing. For bidirectional transmission of data, each terminal (230, 240) may code video data captured at a local location for transmission to the other terminal via the network (250). Each terminal (230, 240) also may receive the coded video data transmitted by the other terminal, may decode the coded data and may display the recovered video data at a local display device.

In FIG. 2, the terminals (210-240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminals (210-240), including for example wireline and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
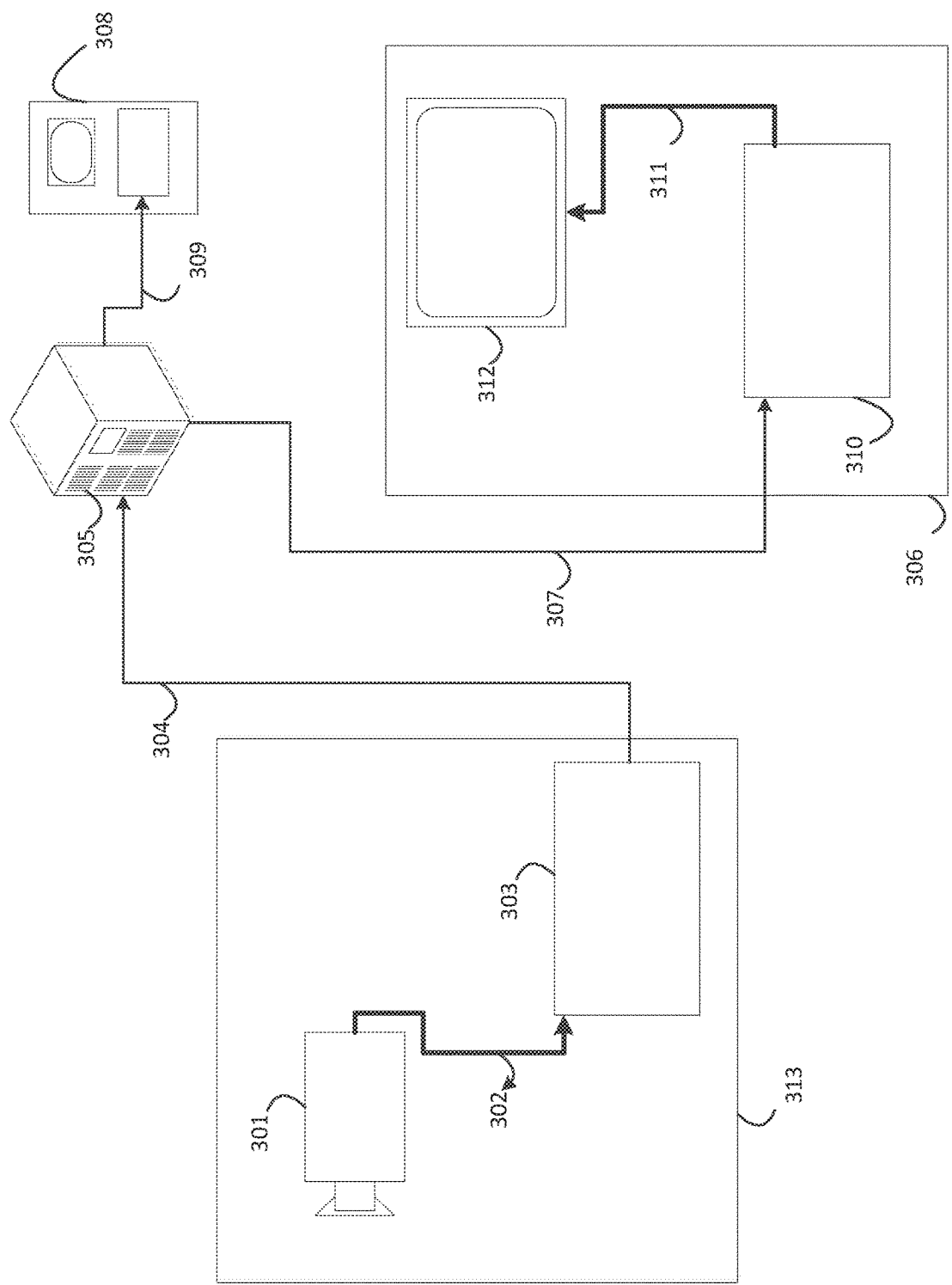
FIG. 3 is a schematic illustration of a simplified block diagram of a communication system in accordance with an embodiment.

FIG. 3 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating a for example uncompressed video sample stream (302). That sample stream (302), depicted as a bold line to emphasize a high data volume when compared to encoded video bitstreams, can be processed by an encoder (303) coupled to the camera (301). The encoder (303) can include hardware, software, or a combination thereof to enable or implement aspects of the disclosed subject matter as described in more detail below. The encoded video bitstream (304), depicted as a thin line to emphasize the lower data volume when compared to the sample stream, can be stored on a streaming server (305) for future use. One or more streaming clients (306, 308) can access the streaming server (305) to retrieve copies (307, 309) of the encoded video bitstream (304). A client (306) can include a video decoder (310) which decodes the incoming copy of the encoded video bitstream (307) and creates an outgoing video sample stream (311) that can be rendered on a display (312) or other rendering device (not depicted). In some streaming systems, the video bitstreams (304, 307, 309) can be encoded according to certain video coding/compression standards. Examples of those standards include ITU-T Recommendation H.265. Under development is a video coding standard informally known as Versatile Video Coding or VVC. The disclosed subject matter may be used in the context of VVC.

Figure 4:
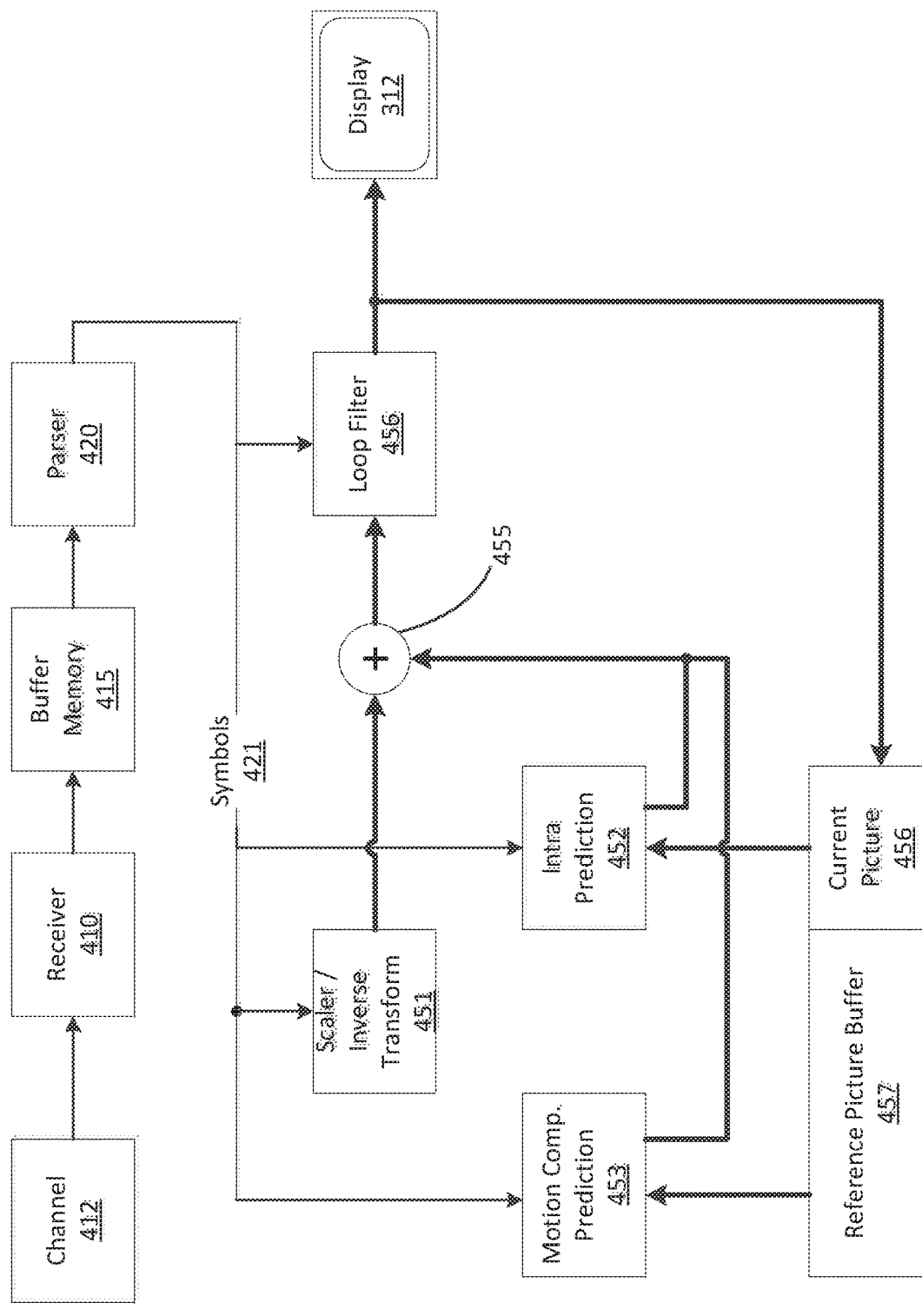
FIG. 4 is a schematic illustration of a simplified block diagram of a decoder in accordance with an embodiment.

FIG. 4 may be a functional block diagram of a video decoder (310) according to an embodiment of the present disclosure.

A receiver (410) may receive one or more codec video sequences to be decoded by the decoder (310); in the same or another embodiment, one coded video sequence at a time, where the decoding of each coded video sequence is independent from other coded video sequences. The coded video sequence may be received from a channel (412), which may be a hardware/software link to a storage device which stores the encoded video data. The receiver (410) may receive the encoded video data with other data, for example, coded audio data and/or ancillary data streams, that may be forwarded to their respective using entities (not depicted). The receiver (410) may separate the coded video sequence from the other data. To combat network jitter, a buffer memory (415) may be coupled in between receiver (410) and entropy decoder/parser (420) ("parser" henceforth). When receiver (410) is receiving data from a store/forward device of sufficient bandwidth and controllability, or from an isosychronous network, the buffer (415) may not be needed, or can be small. For use on best effort packet networks such as the Internet, the buffer (415) may be required, can be comparatively large and can advantageously of adaptive size.

The video decoder (310) may include an parser (420) to reconstruct symbols (421) from the entropy coded video sequence. Categories of those symbols include information used to manage operation of the decoder (310), and potentially information to control a rendering device such as a display (312) that is not an integral part of the decoder but can be coupled to it, as was shown in FIG. 3. The control information for the rendering device(s) may be in the form of Supplementary Enhancement Information (SEI messages) or Video Usability Information (VUI) parameter set fragments (not depicted). The parser (420) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser (420) may perform entropy decoding/parsing operation on the video sequence received from the buffer (415), so to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, decoder 310 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives quantized transform coefficient as well as control information, including which transform to use, block size, quantization factor, quantization scaling matrices, etc. as symbol(s) (421) from the parser (420). It can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current (partly reconstructed) picture (456). The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a Motion Compensation Prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (421) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video bitstream and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (312) as well as stored in the reference picture memory (456) for use in future inter-picture prediction.

Certain coded pictures, once fully reconstructed, can be used as reference pictures for future prediction. Once a coded picture is fully reconstructed and the coded picture has been identified as a reference picture (by, for example, parser (420)), the current reference picture (456) can become part of the reference picture buffer (457), and a fresh current picture memory can be reallocated before commencing the reconstruction of the following coded picture.

The video decoder 420 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (410) may receive additional (redundant) data with the encoded video. The additional data may be included as part of the coded video sequence(s). The additional data may be used by the video decoder (420) to properly decode the data and/or to more accurately reconstruct the original video data. Additional data can be in the form of, for example, temporal, spatial, or SNR enhancement layers, redundant slices, redundant pictures, forward error correction codes, and so on.

Figure 5:
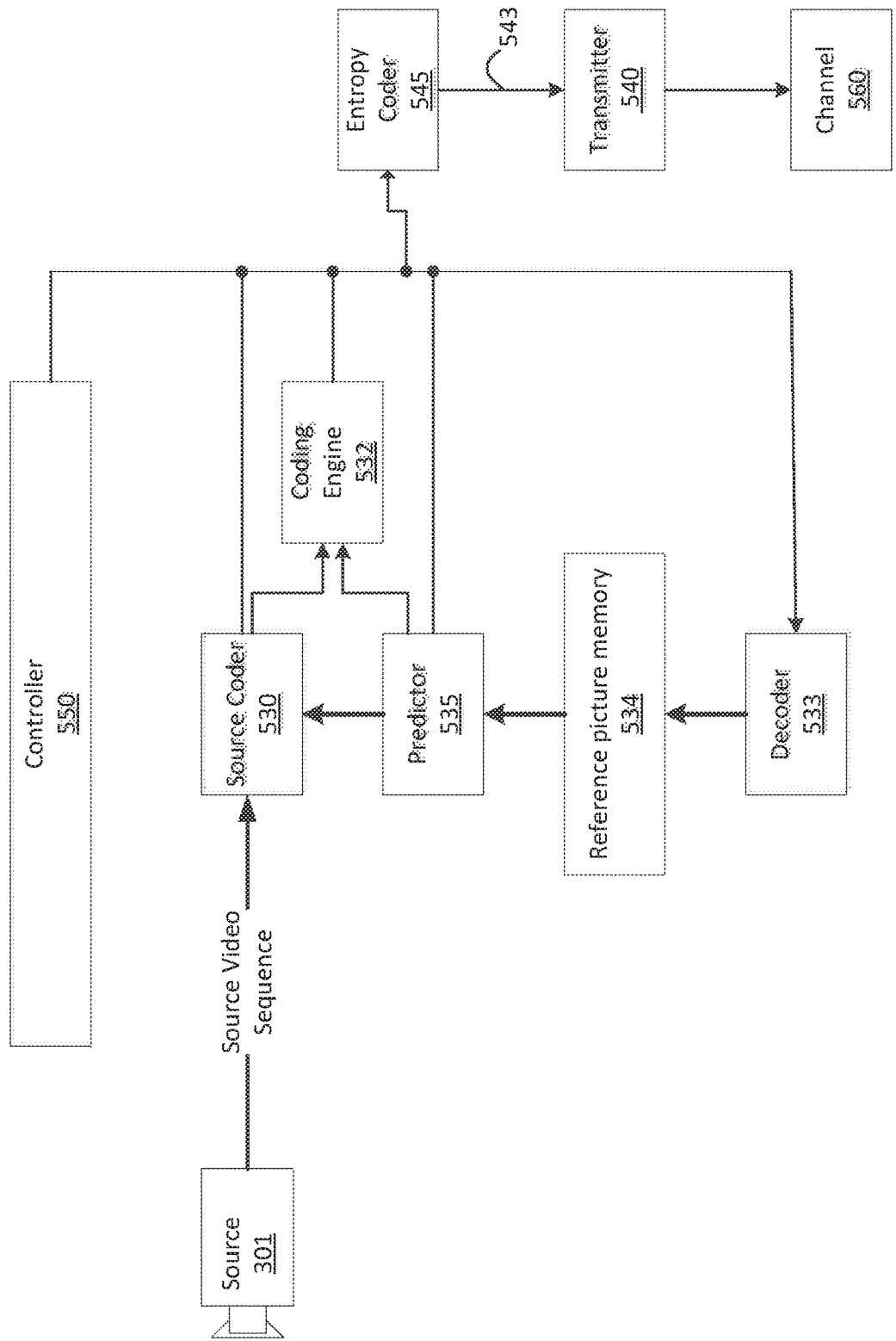
FIG. 5 is a schematic illustration of a simplified block diagram of an encoder in accordance with an embodiment.

FIG. 5 may be a functional block diagram of a video encoder (303) according to an embodiment of the present disclosure.

The encoder (303) may receive video samples from a video source (301) (that is not part of the encoder) that may capture video image(s) to be coded by the encoder (303).

The video source (301) may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (301)

may be a storage device storing previously prepared video. In a videoconferencing system, the video source (303) may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focusses on samples.

According to an embodiment, the encoder (303) may code and compress the pictures of the source video sequence into a coded video sequence (543) in real time or under any other time constraints as required by the application. Enforcing appropriate coding speed is one function of Controller (550). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (550) as they may pertain to video encoder (303) optimized for a certain system design.

Some video encoders operate in what a person skilled in the are readily recognizes as a "coding loop". As an over-simplified description, a coding loop can consist of the encoding part of an encoder (530) ("source coder" henceforth) (responsible for creating symbols based on an input picture to be coded, and a reference picture(s)), and a (local) decoder (533) embedded in the encoder (303) that reconstructs the symbols to create the sample data a (remote) decoder also would create (as any compression between symbols and coded video bitstream is lossless in the video compression technologies considered in the disclosed subject matter). That reconstructed sample stream is input to the reference picture memory (534). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (533) can be the same as of a "remote" decoder (310), which has already been described in detail above in conjunction with FIG. 4. Briefly referring also to FIG. 4, however, as symbols are available and en/decoding of symbols to a coded video sequence by entropy coder (545) and parser (420) can be lossless, the entropy decoding parts of decoder (310), including channel (412), receiver (410), buffer (415), and parser (420) may not be fully implemented in local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

As part of its operation, the source coder (530) may perform motion compensated predictive coding, which codes an input frame predictively with reference to one or more previously-coded frames from the video sequence that were designated as "reference frames." In this manner, the coding engine (532) codes differences between pixel blocks of an input frame and pixel blocks of reference frame(s) that may be selected as prediction reference(s) to the input frame.

The local video decoder (533) may decode coded video data of frames that may be designated as reference frames, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference frames and may cause reconstructed reference frames to be stored in the reference picture cache (534). In this manner, the encoder (303) may store copies of reconstructed reference frames locally that have common content as the reconstructed reference frames that will be obtained by a far-end video decoder (absent transmission errors).

The predictor (535) may perform prediction searches for the coding engine (532). That is, for a new frame to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the video coder (530), including, for example, setting of parameters and subgroup parameters used for encoding the video data.

Output of all aforementioned functional units may be subjected to entropy coding in the entropy coder (545). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare it for transmission via a communication channel (560), which may be a hardware/software link to a storage device which would store the encoded video data. The transmitter (540) may merge coded video data from the video coder (530) with other data to be transmitted, for example, coded audio data and/or ancillary data streams (sources not shown).

The controller (550) may manage operation of the encoder (303). During coding, the controller (550) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (303) may perform coding operations according to a predetermined video coding technology or standard, such as ITU-T Rec. H.265. In its operation, the video coder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The video coder (530) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

In the following the focus of the description will be on the high level syntax of video codecs, and specifically on the NAL unit header (NUH) design.

As NUHs may be interpreted not only by decoders, which can be expected to handle complex syntax, but also by MANEs, file rewriters, and so on (MANEs henceforth), its design has to avoid complex entropy coding schemes such as variable length codes (VLC) or arithmetic coding. On the other hand, a certain amount of complexity, including conditional presence of syntax elements is acceptable, especially if the information conveyed in those syntax elements would otherwise need to be moved outside of the NUH and into the NAL unit payload. The reason for this can be that the NAL unit payload is start code emulation prevention protected and reversing the start code emulation prevention can be a tedious task from both an implementation and computational complexity viewpoint.

For reason of easy processing by MANEs, NUHs have been octet aligned—which implies that their length in bits is divisible by 8. As at least one bit (called forbidden_zero_bit in both H.264 and H.265 NUHs) may as a minimum be required, for reason of start code emulation prevention when video is being transported over an MPEG-2 Transport Stream Channel, the minimum length of a NAL unit header is 8 bits. Ideally, a design should stay within these 8 bits for the most common NAL unit types (NUTs), but may require more bits for more exotic and less frequent NUTs or for NUTs where the header overhead, as a percentage of the coded picture type, is negligible (such as, for example I pictures and their derivates or pictures coded in essentially uncompressed form).

During the development of H.265, a large number of additional NUTs (relative to those in H.264) were specified. Further, in H.265, temporal scalability signaling in the NAL unit header was introduced in the baseline profiles (called Main profile in H.265), and may be in common use today. For future video coding standards, such as VVC, it can be anticipated that neither the number of NUTs, nor the need for temporal scalability will go away. Using six bits for the NUT, one bit for the forbidden_zero_bit, and three bits for the temporal layering information, one arrives at 10 bits which, due to octet alignment, results in a 16 bit NUH in H.265.

Still, it would be desirable from a coding efficiency viewpoint, for the most common NUTs, such as trailing pictures (which may include P pictures/slices/tile groups, B pictures/slices/tile groups, and so forth), to use a NUH of only a single octet. Less commonly used NUTs or NUTs designed for certain applications may use larger headers. The disclosed subject matter implements this desire through the conditional presence of syntax elements beyond the first octet of the NAL unit header, as indicated by one or more dedicated NUTs indicative of a NAL unit type Class, and/or through information in a high level syntax structure available and decodable before the first NAL unit using the extension mechanism is being decoded.

Figure 6:
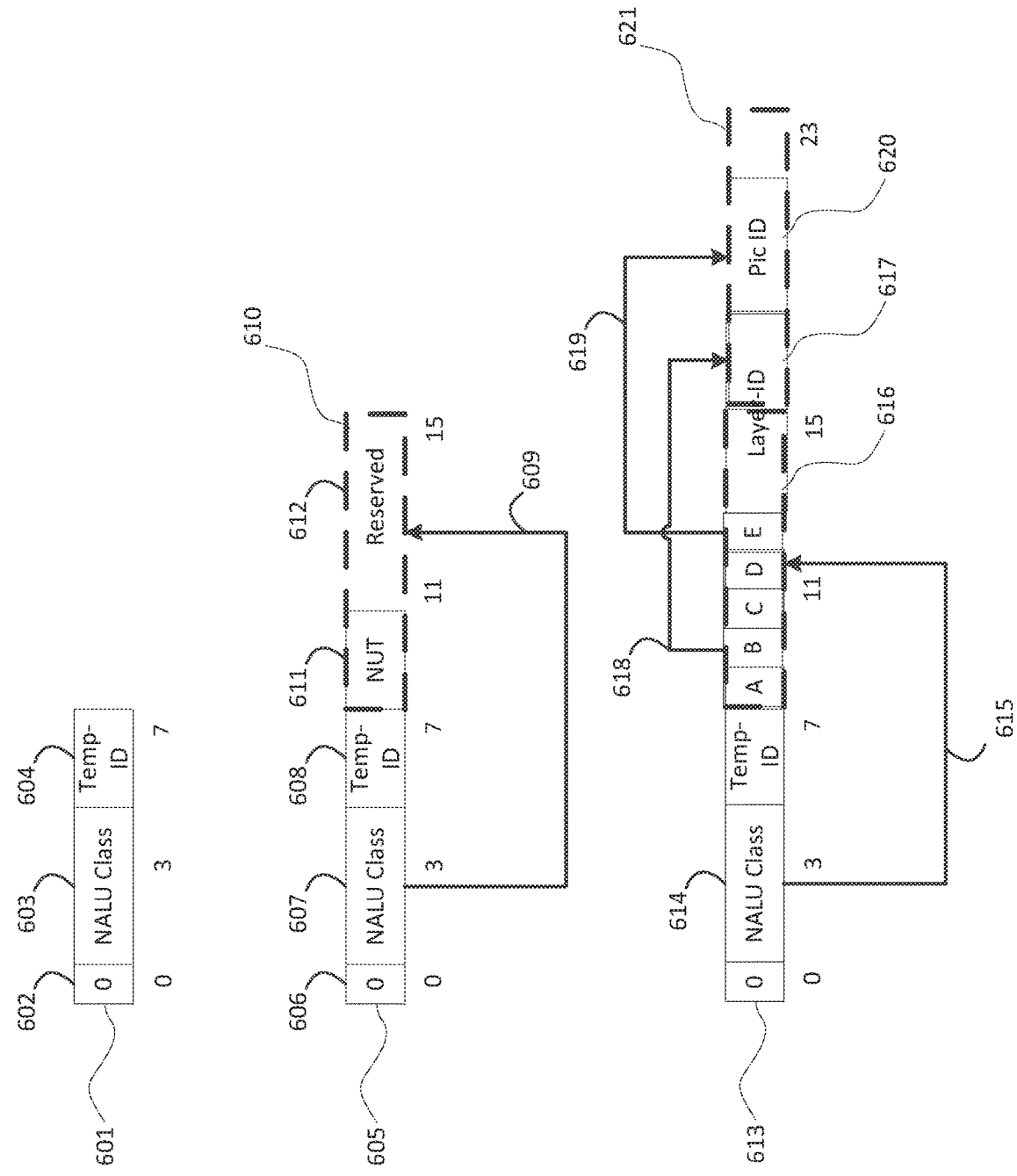
FIG. 6 is a schematic illustration of NALU Headers using an NALU Type Class, in accordance with an embodiment.

Referring to FIG. 6, shown is a NUH (601) in accordance with the disclosed subject matter. The NUH (601) may include a forbidden_zero_bit (602) that may be required for start code emulation prevention in MPEG-2 transport stream based systems. The NUH (601) may further include a NAL unit type class syntax element (603), here denoted as NALU Class and four bits in length. In certain cases as with the depicted NUH (601), and for certain types of NAL unit, especially the ones anticipated to be most common such as P and B pictures/tile-groups/tiles/slices/GOBs/ . . . (P/B segments henceforth), that value could be interpreted as a NAL unit type indicating the P/B segment type directly. The temporal layer information (604) can be similar to what is known from, for example, H.265 and, in this example, may occupy 3 bits.

FIG. 6 includes a second NUH (605), also comprising a forbidden_zero_bit (606) and temporal layer information (608) as previously described. However, for certain other types of NAL units (not carrying, for example, P/B segments), such as random access segment types, leading picture segment types, switching picture segment types, parameter set types, various bitstream markers, and so on, the NAL unit type class syntax element (607) could indicate (609) a class of segment types such as random access segment class, leading picture type class, parameter set type class, marker class, and so on. As a side information, the value of, for example, random access segment class, can trigger the presence of one or more additional octets in the NUH, carrying such info. In this example, one octet (610) is added (depicted as a boldface dashed outline), that includes a NUT of the random access picture within the class (611) (here: indicated by 3 bits), and a number of bits reserved (612) for future extensions and to preserve octet alignment.

Using the NUTs of H.265, as an example, the following classification may be used:

Not included in classes but signaled directly, as they may be quite common in general purpose bitstreams, are TRAIL_N, TRAIL_R, PREFIX_SEI_NUT and SUFFIX_SEI_NUT, Indicating those requires four Class NUTs. In addition, there could be five classes, for a total of nine unreserved or unspecified codepoints.

Class 1: Leading Pictures
RADL_N, RADL_R,
Class 2: Switching Pictures
TSA_N, TSA_R, STSA_N, STSA_R
Class 3: Random Access Pictures
BLA_W_LP, BLA_W_RADL, BLA_N_LP, IDR_W_RADL, IDR_N_LP, CRA_NUT
Class 4: Parameter Sets
(DPS_NUT), VPS_NUT, SPS_NUT, PPS_NUT
Class 5: Markers
AUD_NUT, EOS_NUT, EOB_NUT, FD_NUT.

Introducing the class-based NUT signaling as disclosed above or in similar form would allow, at the expense of additional signaling overhead for less common NAL unit types or NAL unit types associated with commonly large pictures (where the additional overhead, in relation to the coded picture size, may matter less), to reduce the NUT field in the NUH to four bits, and still preserve some numbering space for external use or future extensions.

In certain environment, a class could also be established by mechanisms outside the NAL unit header. For example, in environments and industries where following the parameter set activation sequence in a MANE is not burdensome, class establishment—more precisely here, the presence of additional octets and their syntax—may be triggered through parameter set information. This may be particularly relevant with respect to those parameter sets that are always active in a video bitstream (a concept known as decoder parameter set). A parsing and/or context dependency to profiles or generations of profiles (a concept known in H.265 as "profile space") may also be acceptable. In yet other environments where error resilience is not an issue, even inter NAL unit header prediction may be possible. In that case, a class ID in a first NUH may be used as a parsing dependency to a second NUH following the first NUH.

In the same or another embodiment, certain NAL unit type classes can be used to indicate not only the presence of a NAL unit type in an additional octet, but also other information in the same or yet another octet. For example, in certain applications, it can be useful to include a spatial/SNR layer ID, a Multiview layer ID, a tile id (such as, for example an integer indicative of the n'th tile, in decoding order, in a picture), a component type id (such as, for example, an indicator of color plane(s), attribute(s) in point cloud coding, and so on), a picture id (such as, for example, 8 bits indicative of the Picture Order Count Least Significant Bit (POC LSD), and so on), in a NAL unit type.

Consider NUH (613). Included is a NAL unit type class syntax element (614) that, in the example presented, may be indicative of a trailing picture with additional information. That, in turn can trigger (615) the presence of a first additional octet including a type of NAL unit syntax element. In this example, the size of this NAL unit type syntax element is chosen as 5 bits, each identifies by a letter "A" through "E", where the first bit "A" may indicate whether the NAL unit is TRAL_N or TRAIL_R, and the remaining four bits indicate, as flags, the presence of additional syntax element carrying layer id "B", component id "C", tile id "D", and picture id "E", respectively. All those additional exemplary syntax elements are binary coded integers of a given, fixed length, and they may be assembled in additional octets as indicated by the bits set. In this example, the remainder of the second octet (616) includes the three most significant bits of a layer_id as indicated (618) by the layer id presence bit set to 1, and the first three bits of the third octet include the remaining three bits of layer_id (617). Assume the bits related to component id "C", and tile id "D" are set to zero and therefore indicate non-presence of these fields. Finally, the bit "E" may be in this example set to 1, and that may indicate (619) a 4 bit picture id (620); the remainder of the third octet (621) may be set to zero for padding.

The layout of the additional octets can be different from class to class. For example, for some classes, the numbering space for the NUT in the additional octet may be chosen larger or smaller than 32 (requiring more or less bits than 5). In certain classes, no, or more, or fewer indicator bits may be required when compared to those in NUH (613). Certain additional fields beyond the type of NAL unit syntax element may be always present.

Using this architecture, NUHs could be designed that are larger than three octets, raising start code emulation issues. To combat those, every n'th octet, for example every fourth octet starting with the third octet, could require certain bits to be set or cleared and other NUH field be shifted backwards accordingly, so to prevent start code emulation.

Other architectures for class-based NUHs are also possible. For example, certain field could be required to be at fixed positions. That may have disadvantages when a video coding technology or standard would otherwise allow for highly flexible NUHs, but may simplify MANE implementation.

Figure 7:
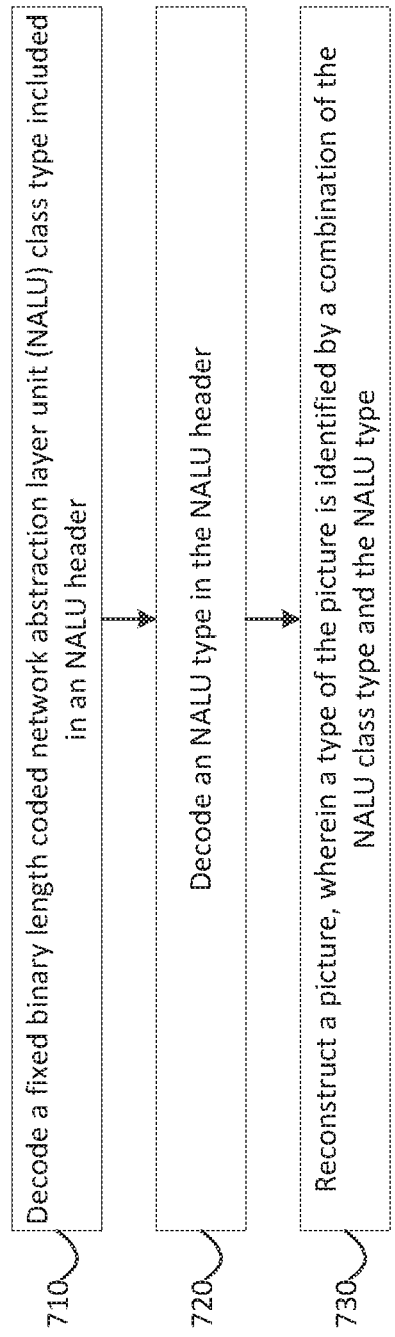
FIG. 7 is a flowchart of an example process in accordance with an embodiment.

FIG. 7 is a flowchart depicting an example process according to an embodiment. As shown in FIG. 7, the process may include decoding a fixed length binary coded network abstraction layer unit (NALU) class type included in an NALU header (block 710); decoding an NALU type in the NALU header (block 720); and reconstructing a picture, wherein a type of the picture is identified by a combination of the NALU class type and the NALU type (block 730).

Figure 8:
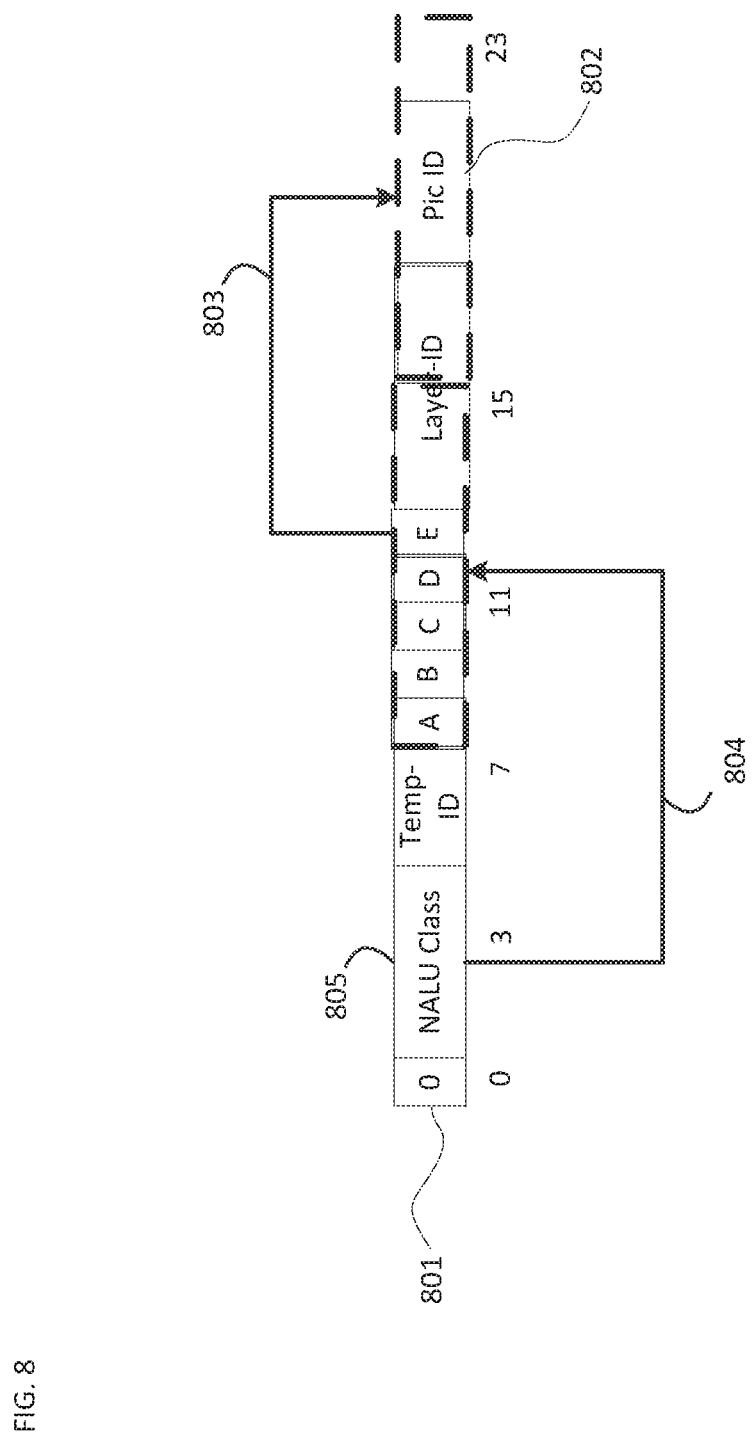
FIG. 8 is a schematic illustration of a NAL unit header comprising a picture_id syntax element in accordance with an embodiment.

Referring to FIG. 8, shown is a syntax diagram (801) of an exemplary NAL unit header, similar to NUH (613). The disclosed subject matter can equally be employed with NAL unit headers of other structures, for example the NAL unit header of H.264, H.265, VVC, or the exemplary NUH (605). In the NAL unit header, a syntax element picture_id (802) can be included. The inclusion can be conditional on the value of bit "E" (803), which presence can in turn be conditional (804) to a certain NAL unit class (805). That picture_id can be in a format easily processable not only by video encoder and decoders, but also by MANEs. By way of example and not as a limitation, the syntax element picture_id (802) is represented by an 5 bit unsigned integer. A 5 bit value provides for a numbering space of 32 values, which can allow uniquely identifying one out of 32 pictures. If, for example, the value of picture_id were incremented by one for each picture being encoded, and wrap around to zero when reaching 32, NAL units belonging to at least 32 pictures would need to be lost before the association of NAL units to pictures would break in an error prone environment.

In the same or another embodiment, the size of the syntax element picture_id (802) can be more or less than 5 bits. In most cases, the larger the syntax element is, the more error resilient the association of NAL units to pictures can be, but at the expense of coding efficiency.

In the same or another embodiment, the size of picture_id (802) can be dependent of other syntax elements in the NAL unit header. For example, the video coding technology or standard can make the size of picture_id dependent on the NAL unit type or NAL unit type class, as previously described. For example, a certain NAL unit type, for example NAL unit type equal to 1, can identify a coded tile group, tile, or slice with a picture_id size of 8 bits, whereas a NAL unit type equal to 2 could identify a tile group, tile, or slice with a picture_id size of 5 bits.

In the same or another embodiment, the size of the picture_id syntax element can be determined by other high level syntax elements, for example parameter sets. For example, the sequence parameter set could include a syntax element indicative of the size of the picture_id (802) syntax element in the NAL unit headers of belonging to the coded video sequence the NAL units belong to. Such a mechanism may create a parsing dependency between NAL units of a coded video sequence and the parameter set which, in certain scenarios, may be undesirable. Further, a MANE may not only need to parse the parameter set in question but also keep, in the form of state, at least parts of its content. That may be undesirable for many applications, but can have advantages from a coding efficiency and codepoint usage viewpoint, and is still preferable over the current situation where a MANE may not only need to parse and interpret parameter sets but also complex variable length syntax structures such as a tile group, tile, or slice header.

Above, one option for setting the value of picture_id (802) was described as round-robin counter of coded pictures. More advanced forms of setting the value may be advantageous. For example, in the same or another embodiment, the picture_id (802) syntax element may be populated by the n least significant bits of the Picture Order Count (POC) value as maintained by encoder and decoder. N, in that case, can be determined by any of the mechanisms described above for determining the size of the picture_id (802) syntax element, or any other suitable mechanism. The use of the least significant bits of POC can have certain advantages. For example, in scenario where the picture/frame rate is fixed, as indicated, for example, by the fixed frame rate flag, and where it is known that the encoder never skips pictures, and where the coding structure is known through, for example, the reception of a coding structure SEI message or out-of-band means, the use of POC can provide implicit timing information in addition to decoding order information.

By the way of example, and not as a limitation, below is summarized how POC is being used in H.265. Other forms of creating or using a unique picture_id based on a picture order count created by video coding technologies and used in those video coding technologies for internal purpose, such as reference picture selection and reference picture list management, can equally be used and are meant to be included in the use of POC as picture_id.

In H.265 each coded picture is associated with a picture order count variable, denoted as PicOrderCntVal. Picture order counts may be used to identify pictures, for deriving motion parameters in merge mode and motion vector prediction, and for decoder conformance checking. In a given Coded Video Sequence (CVS), the PicOrderCntVal values for all coded pictures is unique. Further, picture order counts provide the relative output order of pictures (i.e., from a decoded picture buffer, e.g., for display) included in a CVS (i.e., pictures with lower picture order counts are output before pictures with a higher picture order counts). In ITU-T H.265, the value of PicOrderCntVal is in the range of $-2^{31}$ to $2^{31-1}$, inclusive. The sequence parameter set syntax includes syntax element
log 2_max_pic_order_cnt_lsb_minus4 which specifies the value of a variable MaxPicOrdeiCntLsb that is used in the decoding process for picture order count as follows:

$$\text{MaxPicOrderCntLsb} = 2^{(\log 2\_max\_pic\_order\_cnt\_lsb\_minus4+4)}$$

where the value of log 2_max_pic_order_cnt_lsb_minus4 shall be in the range of 0 to 12, inclusive.

ITU-T H.265 provides where a PicOrderCntVal is equal to PicOrderCntMsb+slice_pic_order_cnt_lsb. slice_pic_order_ cnt_lsb is derived in accordance with section 8.3.1 of that standard.

In certain video coding standards and technologies, including, for example, H.265, the value of POC are included or derivable from certain syntax elements, such as the slice header. In the same or another embodiment, when POC or a derivative thereof (such as: the least significant bits of POC) are included in the NAL unit header, there may be a certain redundancy as the same information may be present in the same NAL unit twice. A video coding technology or standard can address this redundancy by at least one of the following options: accept the coding penalty through the added redundancy in order to minimize the amount of changes to both slice header and NAL unit header in accordance with the disclosed subject matter, or remove the redundant information from the slice header.

Other examples for setting the value of picture_id include, for example, the use of a hash function, the hash being calculated over picture identifying information such as certain elements of the active parameter sets in conjunction with values that are likely to change from picture to picture, such as sample values or POC value. Such a mechanism may not carry any independently useful side information beyond the ability to associate NAL units with coded pictures but could have the advantage of better resilience against bit errors as, statistically, more bits change when a hash function is in use relative to POC increases.

An encoder can write NAL unit headers including a syntax element picture_id populated as described above in a manner similar to writing existing NAL unit header syntax, which is known to a person skilled in the art.

A decoder or MANE can also parse, from a coded video bitstream, a NAL unit header—more precisely—the syntax elements that make up the NAL unit header—in a manner known to a person skilled in the art, irrespective of the presence or absence of picture_id. It should be noted, however, that picture ID, in some cases, is coded without requiring state information and in an accessible entropy coded format, for example a fixed length, binary code. Insofar, parsing a NAL unit header according to the disclosed subject matter may not include additional burdensome operation to decoder or MANE beyond the actual presence of the syntax element picture_id itself.

Figure 9:
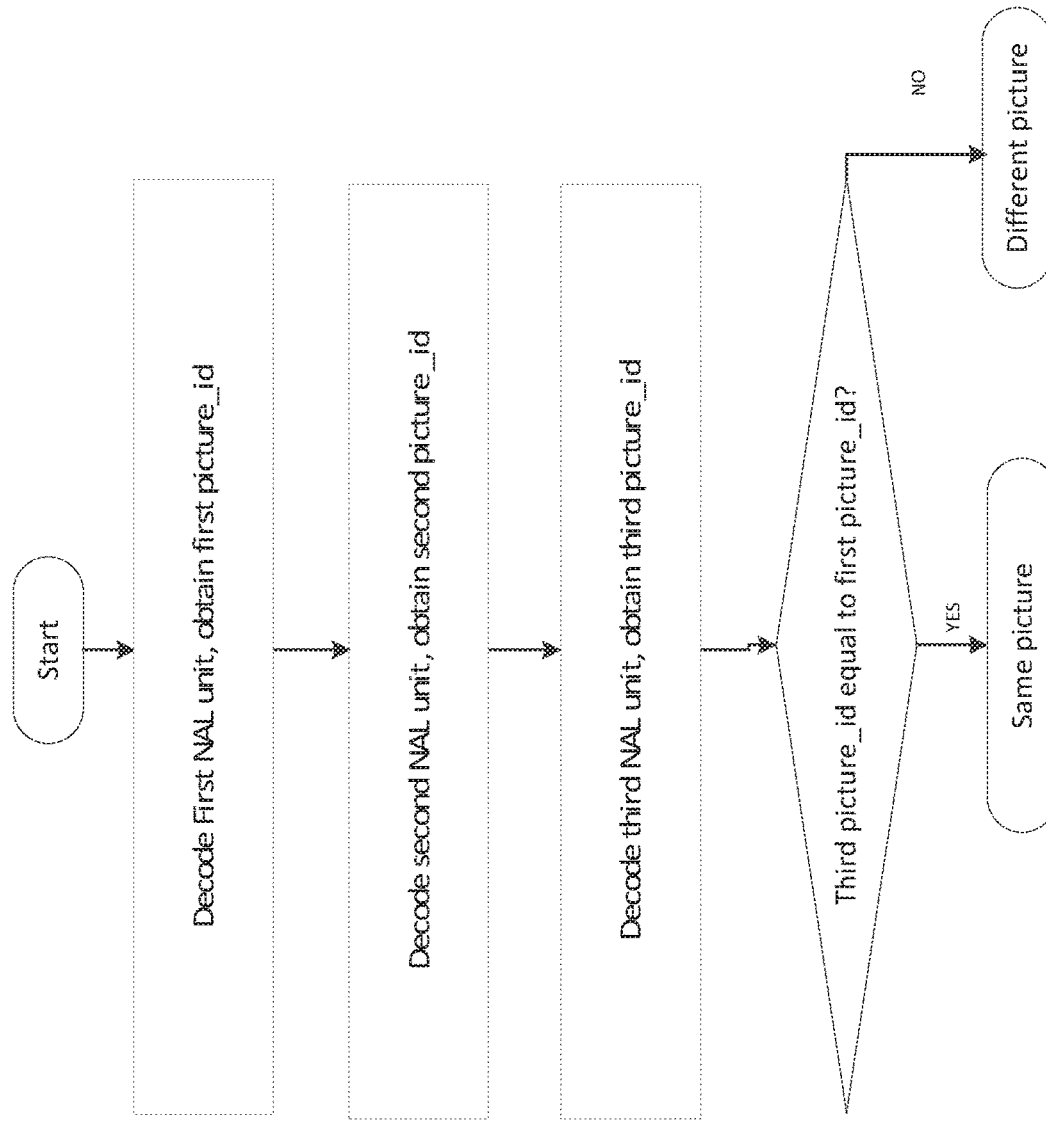
FIG. 9 is a flowchart of an example process in accordance with an embodiment.

In accordance with the disclosed subject matter, decoder or MANE can, however, associate NAL units to coded pictures with little effort when compared to the operations required absent the disclosed subject matter. Referring to FIG. 9, as an example, a decoder or MANE (decoder henceforth) can parse and decode (901) a first NAL unit header comprising a first syntax element picture_id. This first NAL unit header, as an invariant, belongs to a first NAL unit that in turn belongs to a first coded picture.

The decoder can further parse and decode a second NAL unit header (902) comprising a second syntax element picture_id, where the second NAL unit header belongs to a second NAL unit.

The decoder can check the value of the first picture_id against the value of the second picture_id (not depicted). If those values are the same, there is a high likelihood that the two NAL units belong to the same coded picture. The likelihood is influence primarily by the mechanism the encoder is using to populate the value of picture_id, and the size of the syntax element. Both factors have already been discussed above.

The decoder can further parse and decode a third NAL unit header (903) comprising a third syntax element picture_id, where the third NAL unit header belongs to a third NAL unit.

Once more, the decoder can check (904) the value of, for example, the first picture_id against the third picture_id. If those values are the same (905), then there is a high likelihood that the third NAL unit belongs to the same coded picture as the first NAL unit. If, however, the two values are not the same (906), then it is certain that the third NAL unit does not belong to the same picture as the first NAL unit.

The decoder or MANE can utilize the information obtained according to the disclosed subject matter, specifically the picture_id and whether or not a NAL unit belongs to the same picture as another, preceding NAL unit, in any suitable way. For example, a MANE could keep track of POC least significant bit values in the picture_id and match it against a prior knowledge it has about the coding structure. If the MANE would need to dispose of NAL units of the coded video sequence, for example because of congestion on its outgoing link, it could match the picture_id value against the position in the coding structure. Once identified a picture that's suitable for disposal, it could remove all the NAL units of that single picture (but not necessarily the NAL units of other disposable pictures, which may carry the same information in other fields of the NAL unit header). Similarly, a decoder observing CPU cycle starvation could take a similar step. In either case, the negative impact on the user experience may be minimal because only a single disposable picture has been eliminated, and the CPU load in MANE or decoder may also be minimal as the operation is lightweight—involving only fixed length codewords in the NAL unit header.

According to an embodiment, in certain environments, a coded video bitstream can be tailored such that a certain component or a certain set of components ("component" henceforth) can be isolated in certain NAL units. Referring to FIG. 10, in traditional image and video coding standards, information related to set of components, such as Y (1002), Cr (1003), Cb (1004) components, are coded in the same NAL unit (1001) along with information pertaining to all component such as the NAL unit header (1005) and other header information (1006). Certain techniques and prediction mechanisms may be used to leverage the possible similarity of the component signals to gain compression efficiency. For example, when the Y Cr Cb signals are coded in the same NAL unit, covering a slice, tile, and the like, there is no need to code the "location" information (such as, for example, the location of the first CU in the slice/tile in the reconstructed picture) more than once, even if three components are involved. There can also be numerous more sophisticated prediction mechanisms where, in some cases, certain chrominance related information such as chrominance motion vectors, block structures and the like, is predicted from the luminance information.

However, in certain environments, it can be beneficial to code information pertaining to a certain component and a certain tile or slice, or a certain set of components of a certain tile or slice, in their own NAL units, even if that may mean that there can be a loss of coding efficiency due to lack of prediction when compared to coding all components of a tile or slice in a single NAL unit.

Such NAL units, in the same or another embodiment, can be suitably marked. There are many options to mark an NAL unit, including placing the relevant marking information into the NAL unit header, slice header, tile header, tile group header, SEI message associated with, preceding, or following the NAL unit, or any other suitable header or non-header information associated with an NAL unit. Advantageously the marking can be in a form that can be easily accessed, such as: coded in the NAL unit header using a fixed length binary code. As an example and not a limitation, such NAL unit header based marking is henceforth assumed.

In a first example, consider traditional component coding with a Y Cr Cb color model, where a desire exists to be able to prune the color components (Cr, and Cb) from the luminance component Y, so to generate a black and white signal. In video coding schemes such as H.264 or H.265, doing so would require a full transcoding step, as Y, Cr, and Cb information may be predicted from each other and is coded in an interleaved fashion on the macroblock/CU level. In the same or another embodiment, however, the bitstream is structured such that a slice or tile or tile group or other sub-picture partitioning in the spatial domain, as the case may be, is split up into two NAL units. Still referring to FIG. 10, the first of these two NAL unit (1010) may contain a NAL unit header (1011) indicating the presence of Y information, other header info (1012), and luminance (Y)-information (1013). The second NAL unit (1020) may contain information pertaining to both chrominance components (Cr (1023) and Cb (1024)), based on the understanding that, unlike the luminance component, the color components may not have any use individually. Those two components may form a component group, which can be a collection of components with semantic ties so close that separating them is undesirable from the respective application's viewpoint. The NAL unit (1020) may also contain a NAL unit header (1021) indicating the presence of both CR and CB information, and other header information (1022). As the first and the second NAL unit should, according to established practice, be largely independently decodable—and certainly should not contain parsing dependencies on each other—a certain amount of coding inefficiency can be expected when splitting Y and Cr Cb information into two NAL units. Specifically, prediction from the luminance to the chrominance component information (such as, for example, motion vector prediction, block shape prediction, intra direction prediction, among others) may be prohibited, leading potentially to a higher required bitrate for the Cr and Cb information. Further, the other header information (1012) and (1022), respectively, may contain duplicate information. Finally, each NAL unit requires its own NAL unit header (1011) and (1021), respectively, and those two headers can also be expected to take more bits than the single header (1005) of the combined NAL unit (1001). Still, in certain applications, the benefit of easily, without full transcoding, be able to remove a certain component or component group from the bitstream or avoid decoding the component or component group related data (if received by the decoder) can outweigh those coding efficiency penalties.

In a second example, assumed is an image or video coding technology that supports pixel attributes beyond brightness and color. Image or video coding technology has to be interpreted broadly, and can include techniques such as stereoscopic, Multiview, point cloud, light field, and so on. As an early example, certain image and video codecs supported, in addition to sample data coded in YCrCb, RGB, or similar color formats, also transparency information known as an alpha channel. An alpha channel can be represented by having, for a sample or group of samples, a transparency value (alpha) coded in the bitstream. A decoder can reconstruct the alpha map just as the regular sample data. A renderer can use the alpha map to weigh the reconstructed sample data and background information, if any, appropriately so to create an illusion of transparency.

Transparency is but one of many possible attributes of a sample beyond their color and brightness. For example, certain coding technologies, in particular certain 360 degree and point cloud coding technologies, envision samples (or points, in point cloud coding) to include a reflectiveness attribute in addition to brightness/color and perhaps transparency. Further, in point cloud coding, a given point may have associated different attribute values (brightness, color, transparency, reflectiveness, surface normal, curvature, and perhaps others) depending on the viewing direction (viewpoint in space). For example, when a point cloud represents a one-way mirror, which is transparent in one viewing direction, and opaque and reflective in the other, then both transparency and reflectiveness attributes may be radically different depending on the viewpoint. The one way mirror may also be somewhat tinted, which may lead to different color values based both on direction and distance from the point that's on the mirror's surface. As another example, the view-dependent colors can be used to enable a photorealistic rendering of a 3D scene/object from a range of viewpoints, which may be useful for emerging applications such as virtual reality and augmented reality. Further attributes may include wavelengths invisible to the human eye, but relevant for certain applications. For example, certain face recognition sensors use infrared signals in low visible light conditions. Even more advanced attributes may be related to polarization.

With the above, long list of attributes in mind, a requirement exists for pruning a bitstream of advanced signals that are not required by the application, not applicable due to viewing angle, light conditions, and so on, or other reasons not enumerated herein.

Figure 11:
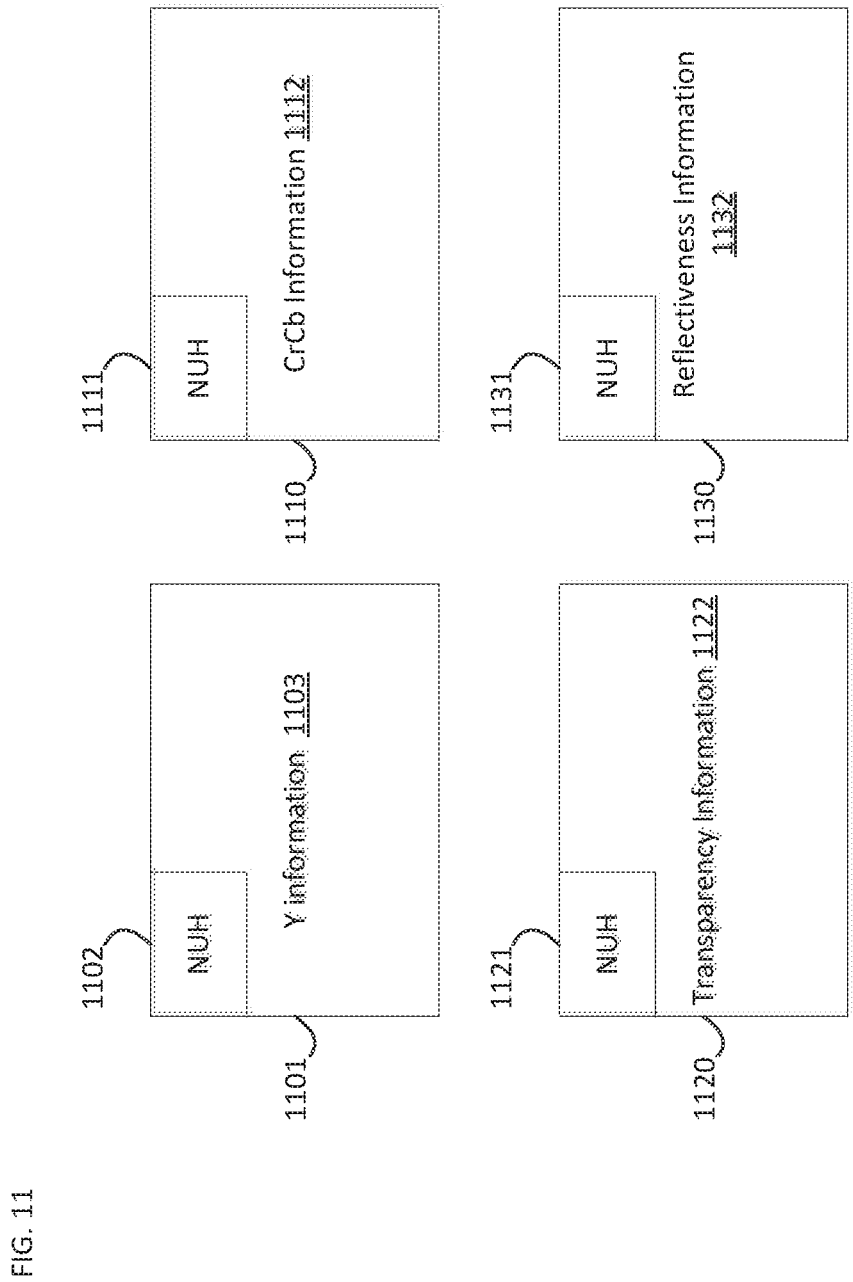
FIG. 11 is a schematic illustration of a NAL units carrying various components or components group, in accordance with an embodiment.

Referring to FIG. 11, shown is a first NAL unit (1101) comprising NAL unit header (1102) indicating Y and Y information (1103). Further, there is a second NAL unit (1110) comprising a NAL unit header (1111) indicating chrominance (Cr Cb) information. A third NAL unit (1120) contains a header indicating transparency information (alpha channel) (1121), and the related transparency information (1122). Finally, there is also a fourth NAL (1130) unit comprising its NAL unit header (1131) indicating reflectiveness information, and the reflectiveness information (1132). The four NAL units may pertain to the same spatial area of the picture that may be represented by a slice, tile, tile group, or the like, or to different areas. However, in the latter case, assume that there exists at least one sample where the sample-associated YCrCb, transparency, and reflectiveness information is included in the four respective NAL units (1101, 1110, 1120, 1130). In that case, certain operations may become possible without coding.

Figure 12:
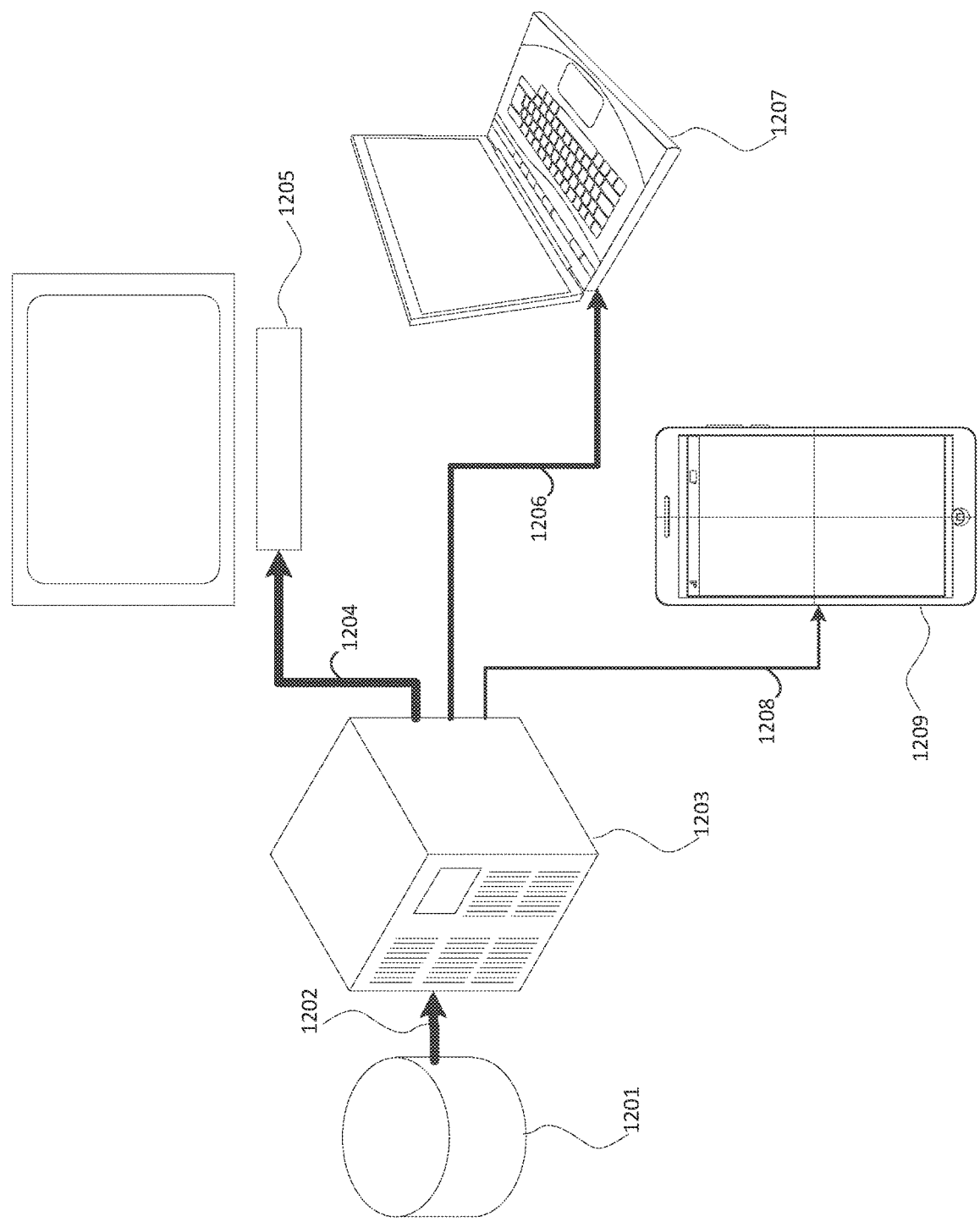
FIG. 12 is a schematic illustration of a system selectively forwarding NAL units with different component types, in accordance with an embodiment.

Briefly referring to FIG. 12, consider a system that includes a data source (1201) that contains a bitstream including all three NAL units, and possibly many more of similar types, i.e. YCrCb NAL units, transparency NAL units, and reflectiveness NAL units. Those NAL units are forwarded (1202) to a server/Media Aware Network Element (MANE henceforth) (1203). Arrow (1202) is depicted as a particularly bold line to emphasize the high bitrate required for all three information types. Three clients have requested the same media bitstream, but have different decoding and/or rendering capabilities, and/or different connectivity. A sophisticated client (1205) may be able to adequately receive, decode, and render all three information types, YCrCb, transparency, and reflectiveness. Accordingly the MANE (1203) may forward all three NAL units to client (1205), requiring substantially similar network capacity (1204) as the connection between source (1201) and MANE (1203). There may further be a second client (1207), represented here by a laptop. That client may have somewhat less decoding capability and/or connectivity disallowing the decoding or transmission of reflectiveness information, or the user may have elected not to be interested in, for example reflectiveness information. Whatever the limiting factor may be, it would be insensible to forward (1206) reflectiveness information to that client. Accordingly, a MANE may remove reflectiveness-related NAL units from the bitstream, resulting in a bitstream of less bitrate. Finally, there may be a third client (1209) represented here by a smartphone. That client may lack the decoding capability and/or the connectivity for both transparency and reflectiveness information, and/or the use may have indicated not being interested in one or both of those. Accordingly, the MANE (1203) may decide to forward (1208) only NAL units carrying YCrCb information to the third client (1209).

Assuming traditional coding technologies where information of all attributes may be encoded in the same NAL unit, the MANE (1203) may require full transcoding steps to extract the information relevant for each of the clients (1205, 1207, 1209). Doing so can be computationally expensive, raising the cost for the MANE (1203). Filtering NAL units, however, can be a lightweight process as it can be based on the NAL unit header, either exclusively or in combination of other easily parseable and readily accessible information in the high level syntax, such as parameter sets, SEI messages, slice/tile/tile group headers, or the like.

The best solution from a MANE's viewpoint may be to have all relevant information required for bitstream pruning available in the NAL unit header, and that was assumed so far. Somewhat more tedious can be to require the decoding of fixed or variable length codewords in the information carried by the NAL unit itself, advantageously at the very beginning of the NAL unit just after the NAL unit header ("other header info, for example (1002) or (1003) in FIG. 10). Two scenarios may be possible. In one more advantageous scenario, the "other header info", to the extent required to determine the type of information carried by the NAL unit, may be interpretable without context obtained from other NAL units, such as parameter set NAL units. In that case, the additional complexity for the MANE may be restricted to parsing information of the other header info, which may include variable length code and the like, and may therefore be more computationally expensive than the fixed length NAL unit header codepoints. Even more problematic can be that the determination of the type of information carried by the NAL unit requires the interpretation of other header information (1002, 1003) in the context of parameter sets and the like. In that case, the MANE would have to keep track of the activation of parameter sets as well as certain other tasks, which can already amount to, in practice, decoding substantially all of the high layer syntax. While still easier than a full transcoding step, parameter-set based context sensitive decoding can be overly tedious for most MANE architectures.

Described now, as examples and not as limitations are options to represent the component or component group type in a NAL unit header. The options presented reflect the basic syntax layout and architecture of the NAL unit header design of H.265. There may be other options that may be more suitable to a given NAL unit header architecture that may be used in other coding technologies and standards.

Figure 13:
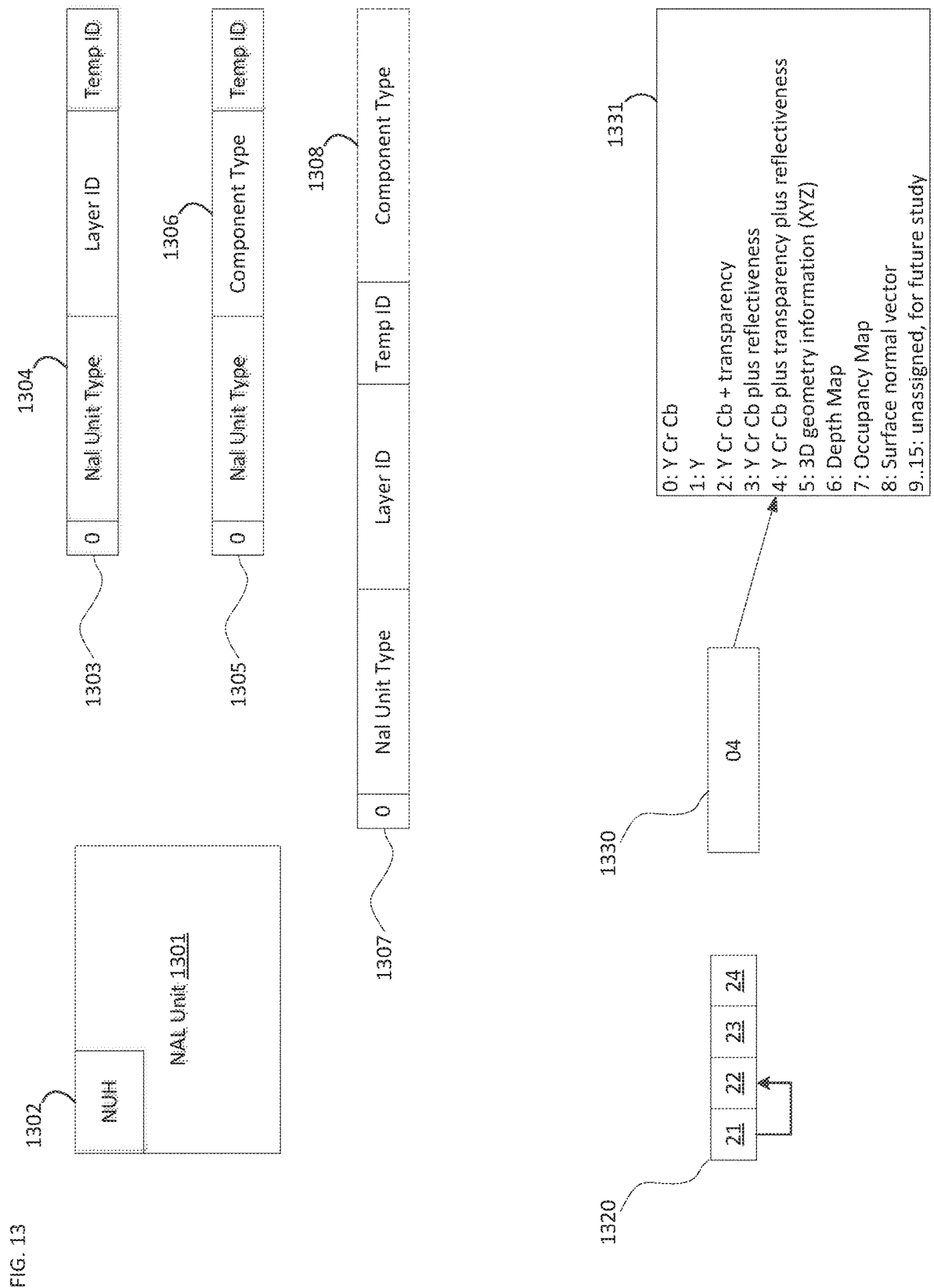
FIG. 13 is a schematic illustration syntax diagrams for NAL units carrying various components or components group, in accordance with an embodiment.

Referring to FIG. 13, the component or component group can be indicated, for example, as follows in the NAL unit header (1302) of a NAL unit (1301):

In the same or another embodiment, in a first option, the component or component group can be indicated in a NAL unit header (1303) using the numbering space of the NAL unit type (1304). Specifically, the NAL unit type may include codewords indicative of a coded slice, tile, tile group, and similar, carrying only a certain component or component group. Implicitly, a subset of such signaling exists in H.265, in that for a component group Y Cr Cb there exists a slice type indicated by a given value of NAL unit type. However, more codewords can be allocated, to the extent possible by unallocated codepoints in the fixed numbering space (due to fixed length codeword for NAL unit type) for other components or component types. A video coding standard or technology can assign one or more available to component types based on the understanding of the standards setting committee at the time of writing the standard of what components or component groups may become relevant for bitstream pruning and other applications, during the lifetime of the standard. Using this option, no syntax changes in the NAL unit header would be required.

In a second option, certain existing fields of the H.265-style NAL unit header (1305) that are meaningful only in specific profiles may be reallocated to indicate component type. In FIG. 9, the bit previously used by the layer ID field (1306) are used as the component type fields, but other fields of the NAL unit header may be reallocated as well. Doing so may technically create an undesirable parsing and context dependency to the profile, which may be coded in parameter sets. However, in contrast to most other parameter set values, the profile ID is widely understood to be available a priori to MANEs through mechanisms such as capability exchange; therefore such a profile dependency may not be as problematic as parsing and context dependencies to other fields in parameter sets. However, the second option may preclude the simultaneous use of, for example, layered or Multiview coding with bitstream pruning based on NAL unit header coded component types.

In a third option, all aforementioned shortcomings can be avoided, at the expense of adding bits to the NAL unit header (1307). Specifically, a field component type (908) may be included at a fixed position in the NAL unit header, for example at the end. While this option is the most flexible, it is also the least desirable from a coding efficiency viewpoint. However, it should be noted that the presence of component type (1308) may be conditioned to the use of certain profiles (and is therefore depicted in dashed lines), alleviating coding efficiency impact for profiles not interested in component type based processing. Alternatively, or in addition, the presence of component type may also be restricted to certain values of the NAL unit type field. For example, conceivable, there could be a NAL unit type for a traditional Y Cr Cb slice/tile/tile group, as well as a different NAL unit type for a slice/tile/tile group with additional component type signaling. While such optional NAL unit header information fields have not yet been included in known video coding standards or technologies, the obstacles for implementing them in encoder, decoder, or MANE are lower than having a context dependency to parameter set values, and are therefore preferred. Of course, that mechanism may take away numbering space from the NAL unit type numbering space.

In a fourth option, the syntax used to include component information in the NAL unit header or comparable syntax element can, for example, follow the design principles for extensable NAL unit headers as previously described. In particular, a mechanism similar to the one described in the context of Picture ID and FIG. 8 may be used. Specifically, the component ID can replace the Picture ID (802). Other options are described below. Other options may be sensible for NAL unit header designs not following the NAL unit header design of H.265, which was assumed above If the component type (1306, 1308) is coded in its own field (instead of populating unused codepoints in the NAL Unit type), certain options for the coding of the component type become available.

Still referring to FIG. 13, in the same or another embodiment, component type (1320) may be interpreted as bit mask. In the example presented, a four bit component type is populated by one bit each for Luminance data (Y) (921)
Chrominance data (Cr, Cb) (922)
Transparency (alpha) (923), and
Reflectiveness (924).

Such a bitmask-based design can be advantageous if the number of components is reasonably small (such as: four to eight), thereby limiting the size of the bitmask to a sensible amount. It also allows a very flexible layout of the NAL unit content; for example, it would be possible (in the same video bitstream) to include NAL units covering Y Cr Cb, or Y with transparency, or Y Cr Cb with transparency and reflectiveness. Whether or not such flexibility is desirable from an application viewpoint may be questionable, though: while the flexible NAL unit payload layout certainly may be welcome, over-exercising that flexibility by encoders may lead to scenarios where a MANE cannot remove anymore undesired components.

As an alternative, component type may also be interpreted as an enumerator into a list of pre-defined components or component groups.

For example, component type (1330) may be a four bit unsigned integer. Other lengths of that bit field may be possible, and may be dependent on profile or other easily obtainable information, including information in the NAL unit type as described above.

The four bit unsigned integer value allows for 16 different components or component groups. FIG. 13 enumerates (1331) a few possible options as follows:

0: Y Cr Cb
1: Y
2: Y Cr CB plus transparency
3; Y Cr Cb plus reflectiveness
4: Y Cr Cb plus transparency and reflectiveness
5: 3D geometry information (XYZ)
6: Depth map
7: Occupancy map
8: Surface normal vector
9 . . . 15: unassigned.

A value of 4 in component type can, in such a scenario, indicate (1332) that the NAL unit may contain information pertaining to Y, Cr, Cb, transparency and reflectiveness.

In the same or another embodiment, it can be a necessary condition but not a sufficient condition for a NAL unit to contain information pertaining to a certain component type when such component type is indicated by any of the above mechanisms. This can be similar to, for example slice types. For example, a B-slice may contain bi-predicted coding units, but may also consist exclusively of intra coded coding units.

In the same or another embodiment, a NAL unit may contain information pertaining to a certain component type and a certain viewing angle. The viewing angle can be identified by a view identifier (e.g. left or right view) or an extrinsic/intrinsic camera parameter sets. For example, component type (1330) may be a four bit unsigned integer and can have one of the following options:

0: Y Cr Cb plus depth map corresponding to left camera
1: Y Cr Cb plus depth map corresponding to right camera
2: XYZ geometry information plus occupancy map
3 . . . 15: unassigned.

The techniques for Network Abstraction Unit Layer Type Classes in Network Abstraction Layer Unit Header, described above, and/or the techniques for Picture Reference in Network Abstraction Unit Header described above can be implemented as computer software using computer-readable instructions and physically stored in one or more computer-readable media. For example, FIG. 14 shows a computer system 1400 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 14 for computer system 1400 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1400.

Computer system 1400 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1401, mouse 1402, trackpad 1403, touch screen 1410, data-glove 1404, joystick 1405, microphone 1406, scanner 1407, camera 1408.

Computer system 1400 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1410, data-glove 1404, or joystick 1405, but there can also be tactile feedback devices that do not serve as input devices), audio output devices (such as: speakers 1409, headphones (not depicted)), visual output devices (such as screens 1410 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1400 can also include human accessible storage devices and their associated media such as optical media including CD/DVD ROM/RW 1420 with CD/DVD or the like media 1421, thumb-drive 1422, removable hard drive or solid state drive 1423, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1400 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1449) (such as, for example USB ports of the computer system 1400; others are commonly integrated into the core of the computer system 1400 by attachment to a system bus as described below (for example Ethernet interface into a PC computer system or cellular network interface into a smartphone computer system). Using any of these networks, computer system 1400 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1440 of the computer system 1400.

The core 1440 can include one or more Central Processing Units (CPU) 1441, Graphics Processing Units (GPU) 1442, specialized programmable processing units in the form of Field Programmable Gate Areas (FPGA) 1443, hardware accelerators for certain tasks 1444, and so forth. These devices, along with Read-only memory (ROM) 1445, Random-access memory 1446, internal mass storage such as internal non-user accessible hard drives, SSDs, and the like 1447, may be connected through a system bus 1448. In some computer systems, the system bus 1448 can be accessible in the form of one or more physical plugs to enable extensions by additional CPUs, GPU, and the like. The peripheral devices can be attached either directly to the core's system bus 1448, or through a peripheral bus 1449. Architectures for a peripheral bus include PCI, USB, and the like.

CPUs 1441, GPUs 1442, FPGAs 1443, and accelerators 1444 can execute certain instructions that, in combination, can make up the aforementioned computer code. That computer code can be stored in ROM 1445 or RAM 1446. Transitional data can be also stored in RAM 1446, whereas permanent data can be stored for example, in the internal mass storage 1447. Fast storage and retrieve to any of the memory devices can be enabled through the use of cache memory, that can be closely associated with one or more CPU 1441, GPU 1442, mass storage 1447, ROM 1445, RAM 1446, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1400, and specifically the core 1440 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1440 that are of non-transitory nature, such as core-internal mass storage 1447 or ROM 1445. The software implementing various embodiments of the present disclosure can be stored in such devices and executed by core 1440. A computer-readable medium can include one or more memory devices or chips, according to particular needs. The software can cause the core 1440 and specifically the processors therein (including CPU, GPU, FPGA, and the like) to execute particular processes or particular parts of particular processes described herein, including defining data structures stored in RAM 1446 and modifying such data structures according to the processes defined by the software. In addition or as an alternative, the computer system can provide functionality as a result of logic hardwired or otherwise embodied in a circuit (for example: accelerator 1444), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method for decoding a video sequence, comprising:
    decoding a fixed length binary coded network abstraction layer unit (NALU) class type included in an NALU header;
    decoding an NALU type in the NALU header; and
    reconstructing a picture, wherein a type of the picture is identified by a combination of the NALU class type and the NALU type,
    wherein the method further comprises:
        decoding a first NALU header comprising a first syntax element picture identifier, the first NALU header belonging to a first NALU, the first NALU belonging to a first coded picture;
        decoding a second NALU header comprising a second syntax element picture identifier, the second NALU header belonging to a second NALU, the second NALU belonging to the first coded picture; and
        decoding a third NALU header comprising a third syntax element picture identifier, the third NALU header belonging to a third NALU, the third NALU belonging to a second coded picture,
    wherein a value of the first syntax element picture identifier is equal to a value of the second syntax element picture identifier, and
    wherein a value of the third syntax element picture identifier is not equal to the value of the first syntax element picture identifier.

2. The method of claim 1, wherein:
    the NALU type includes a first bit at a first fixed position in the NALU type, and
    the first bit is indicative of a presence of a first fixed length codeword in the NALU header.

3. The method of claim 2, wherein:
    the NALU type includes a second bit at a second fixed position in the NALU type,
    the second bit is indicative of a presence of a second fixed length codeword in the NALU header, and
    the second fixed length codeword follows the first fixed length codeword.

4. The method of claim 2, wherein:
    the NALU type includes a second bit at a second fixed position in the NALU type,
    the second bit is indicative of a presence of a second fixed length codeword in the NALU header,
    a start code emulation prevention bit follows the first fixed length codeword, and
    the start code emulation prevention bit is followed by the second fixed length codeword.

5. The method of claim 2, wherein:
    the first fixed length codeword is at least one of a spatial/signal to noise ratio layer identifier, a multiview layer identifier, a tile identifier, a component type identifier, and a picture identifier.

6. The method of claim 1, wherein the first syntax element picture identifier is coded as a fixed length, binary coded codeword.

7. The method of claim 1, wherein the value coded in the first syntax element is derived from a picture order count (POC).

8. The method of claim 1, further comprising:
    decoding a first NALU header of a first NALU, the first NALU comprising at least one syntax element required for the decoding at least one first component; and decoding a second NALU header of a second NALU, the second NALU comprising at least one syntax element required for the decoding of at least one second component, the at least one second component being different from the at least one first component; wherein the first and second NALU header comprise at least one syntax element indicative of the at least one second component being different from the at least one first component.

9. The method of claim 8, wherein the first and second NALU header include a first and second syntax element component type, respectively, and wherein the indication of the at least one second component being different from the at least one first component is that the value of the second component type is different from the first component type.

10. A device for decoding a video sequence, comprising:
at least one memory configured to store program code; and
at least one processor configured to read the program code and operate as instructed by the program code, the program code including:
decoding code configured to cause the at least one processor to:
decode a fixed length binary coded network abstraction layer unit (NALU) class type included in an NALU header; and
decode an NALU type in the NALU header; and
reconstructing code configured to cause the at least one processor to reconstruct a picture, wherein a type of the picture is identified by a combination of the NALU class type and the NALU type,
wherein the decoding code is further configured to cause the at least one processor to:
decode a first NALU header of a first NALU, the first NALU comprising at least one syntax element required for the decoding at least one first component; and
decode a second NALU header of a second NALU, the second NALU comprising at least one syntax element required for the decoding of at least one second component, the at least one second component being different from the at least one first component;
wherein the first and second NALU header comprise at least one syntax element indicative of the at least one second component being different from the at least one first component.

11. The device of claim 10, wherein:
the NALU type includes a first bit at a first fixed position in the NALU type, and
the first bit is indicative of a presence of a first fixed length codeword in the NALU header.

12. The device of claim 11, wherein:
the NALU type includes a second bit at a second fixed position in the NALU type,
the second bit is indicative of a presence of a second fixed length codeword in the NALU header, and
the second fixed length codeword follows the first fixed length codeword.

13. The device of claim 11, wherein:
the NALU type includes a second bit at a second fixed position in the NALU type,
the second bit is indicative of a presence of a second fixed length codeword in the NALU header,
a start code emulation prevention bit follows the first fixed length codeword, and the start code emulation prevention bit is followed by the second fixed length codeword.

14. The device of claim 11, wherein:
the first fixed length codeword is at least one of a spatial/signal to noise ratio layer identifier, a multiview layer identifier, a tile identifier, a component type identifier, and a picture identifier.

15. The device of claim 10, wherein the decoding code is further configured to cause the at least one processor to:
decode a first NALU header comprising a first syntax element picture identifier, the first NALU header belonging to a first NALU, the first NALU belonging to a first coded picture;
decode second NALU header comprising a second syntax element picture identifier, the second NALU header belonging to a second NALU, the second NALU belonging to the first coded picture; and
decode a third NALU header comprising a third syntax element picture identifier, the third NALU header belonging to a third NALU, the third NALU belonging to a second coded picture,
wherein a value of the first syntax element picture identifier is equal to a value of the second syntax element picture identifier, and
wherein a value of the third syntax element picture identifier is not equal to the value of the first syntax element picture identifier.

16. The device of claim 15, wherein the first syntax element picture identifier is coded as a fixed length, binary coded codeword.

17. The device of claim 15, wherein the value coded in the first syntax element is derived from a picture order count (POC).

18. A non-transitory computer-readable medium storing instructions, the instructions comprising: one or more instructions that, when executed by one or more processors of a device, cause the one or more processors to:
decode a fixed length binary coded network abstraction layer unit (NALU) class type included in an NALU header;
decode an NALU type in the NALU header; and
reconstruct a picture, wherein a type of the picture is identified by a combination of the NALU class type and the NALU type,
wherein the instructions further cause the one or more processors to:
decode a first NALU header comprising a first syntax element picture identifier, the first NALU header belonging to a first NALU, the first NALU belonging to a first coded picture;
decode second NALU header comprising a second syntax element picture identifier, the second NALU header belonging to a second NALU, the second NALU belonging to the first coded picture; and
decode a third NALU header comprising a third syntax element picture identifier, the third NALU header belonging to a third NALU, the third NALU belonging to a second coded picture,
wherein a value of the first syntax element picture identifier is equal to a value of the second syntax element picture identifier, and
wherein a value of the third syntax element picture identifier is not equal to the value of the first syntax element picture identifier.

* * * * *